(12) United States Patent
Nikolov

(10) Patent No.: US 7,426,723 B1
(45) Date of Patent: Sep. 16, 2008

(54) CLASSFILE CONVERSION INTO AN ORGANIZATION OF OBJECTS, AND MODIFICATION THEREOF, TO EFFECT BYTECODE MODIFICATION

(75) Inventor: Nikolai G. Nikolov, Sofia (BG)

(73) Assignee: SAP AG, Walldorf (DE)

( * ) Notice: Subject to any disclaimer, the term of this patent is extended or adjusted under 35 U.S.C. 154(b) by 549 days.

(21) Appl. No.: 10/750,396

(22) Filed: Dec. 30, 2003

(51) Int. Cl.
*G06F 9/45* (2006.01)
*G06F 9/44* (2006.01)

(52) U.S. Cl. .................. 717/151; 717/152; 717/153; 717/159; 717/116

(58) Field of Classification Search ................ 717/116, 717/151, 152, 153, 159
See application file for complete search history.

(56) References Cited

U.S. PATENT DOCUMENTS

| | | | |
|---|---|---|---|
| 5,748,963 A | 5/1998 | Orr | |
| 6,026,237 A * | 2/2000 | Berry et al. | 717/130 |
| 6,118,940 A | 9/2000 | Alexander, III et al. | |
| 6,260,187 B1 | 7/2001 | Cirne | |
| 6,381,735 B1 | 4/2002 | Hunt | |
| 6,631,515 B1 | 10/2003 | Berstis | |
| 6,658,600 B1 | 12/2003 | Hogdal et al. | |
| 6,662,359 B1 | 12/2003 | Berry et al. | |
| 6,895,578 B1 | 5/2005 | Kolawa et al. | |
| 6,934,942 B1 | 8/2005 | Chilimbi | |
| 6,961,918 B2 | 11/2005 | Garner et al. | |
| 6,968,540 B2 | 11/2005 | Beck et al. | |
| 7,093,234 B2 | 8/2006 | Hibbeler et al. | |
| 2002/0073063 A1 | 6/2002 | Faraj | |
| 2002/0170036 A1 | 11/2002 | Cobb et al. | |
| 2004/0031020 A1 | 2/2004 | Berry et al. | |
| 2004/0123279 A1 | 6/2004 | Boykin et al. | |
| 2005/0039171 A1* | 2/2005 | Avakian et al. | 717/127 |
| 2005/0039187 A1 | 2/2005 | Avakian et al. | |

OTHER PUBLICATIONS

Ian Welch, et al., "Kava-A Reflective Java Based on Bytecode Rewriting" SpringerLink -Verlag Berling Heidelberg 2000, Chapter, Lecture Notes in Computer Science, W. Cazzola, et al. Editors, Reflection and Software Engineering, LNCS, pp. 155-167.

(Continued)

*Primary Examiner*—Wei Zhen
*Assistant Examiner*—Qamrun Nahar
(74) *Attorney, Agent, or Firm*—Blakely, Sokoloff, Taylor & Zafman, LLP

(57) ABSTRACT

A classfile modification method is described. The classfile modification method entails converting a classfile into a collection of objects whose organization is derived from the classfile's organization. The collection of objects comprise unique objects for each method information structure found in the classfile. Each of the unique objects reference other objects in the organization. The other objects represent their corresponding unique object's method information structure's byte code instructions. The classfile modification method also entails adding at least one additional other object to an arrangement of other objects that are referenced to a unique object. The at least one additional other object corresponds to at least one byte code instruction that causes a plug-in module's handler method to provide output function treatment for the unique object's method. The classfile modification method also entails converting the resulting collection of objects into a modified version of the classfile.

45 Claims, 38 Drawing Sheets

OTHER PUBLICATIONS

Wily Technology, Inc., Wily Solutions "How Introscope® Works"—Enterprise Application Management, http/www.wilytech.com/solutions/products/howWorks.html, 1999-2004, printed Jul. 2, 2004 (1 page).

Ben Stephenson, et al., "Characterization and Optimization of Java Applications" Department of Computer Science, Abstract in Western Research Forum Program & Abstracts, p. 20, 2003.

Wily Technology, Inc., Wily Solutions "Wily Introscope®"—Enterprise Application Management, http://www.wilytech.com/solutions/products/Introscope.html, 1999-2004, printed Jul. 2, 2004 (2 pgs.).

Sun Microsystems, Java—J2EE 1.4 Application Server Developer's Guide, "Debugging J2EE Applications" Chapter 4, http://java.sun.com/j2ee/1.4/docs/devguide/dgdebug.html, 2003, printed Jul. 2, 2004 (11 pgs.).

Wily Technology, Inc., Wily Technology, Inc., Wily Solutions "The Wily 5 Solution—Enterprise Applications are Your Business", http://www.wilytech.com/solutions/ibm_family.html, 1999-2004, printed Jul. 2, 2004 (2 pgs.).

Ajay Chander et al., "Mobile Code Security by Java Bytecode Instrumentation", Proceedings of the DARPA Information Survivability Conference & Exposition DISCEX-II 2001, Jun. 12-14, 2001, Stanford University and University of Pennsylvania, [*Partially supported by DARPA contract N66001-00-C-8015 and ONR grant N00014-97-1-0505] (14 pgs.).

Mobile-Code Security Mechanisms for Jini—"Mobile-Code Security Mechanisms for Jini" Download code, DISCEX 2001 Paper, http://theory.stanford.edu/people/jcm/software/jinifilter.html, printed Jul. 2, 2004—(3 pgs.).

Allen Goldberg, et al., "Instrumentation of Java Bytecode for Runtime Analysis", Fifth ECOOP Workshop on Formal Techniques for Java-like Programs, Jul. 21, 2003, Kestrel Technology, NASA Ames Research Center, Moffett Field, California USA, (9 pgs.).

Algis Rudys, et al., "Enforcing Java Run-Time Properties Using Bytecode Rewriting", International Symposium on Software Security (Tokyo, Japan), Nov. 2002, Rice University, Houston, TX 77005, USA (16 pgs.).

Han Bok Lee, et al., "BIT: A Tool for Instrumenting Java Bytecodes", originally published in the Proceedings of the USENIX Symposium on Internet Technologies and Systems, Monterey, California, Dec. 1997, www.usenix.org/ (11 pgs.).

Reinhold Plösh, Johannes Kepler University Linz, Austria, "Evaluation of Assertion Support for the Java Programming Language", JOT: Journal of Object Technology, vol. 1, No. 3, Special issue: TOOLS USA 2002 Proceedings, pp. 5-17, http://www.jot.fm/issues/issue_2002_08/article1.

Etienne Gagnon, et al., "Effective Inline—Threaded Interpretation of Java Bytecode Using Preparation Sequences", Sable Research Group, Université du Québec à Montréal and Mcgill University, Montreal. Canada, Jan. 2003 (15 pgs.).

Geoff A. Cohen, et al., Software-Practice and Experience, [Version: Mar. 6, 2000 v2.1] "An Architecture for Safe Bytecode Insertion", Department of Computer Science, Duke University (27 pgs.).

Reynald Affeldt, et al., "Supporting Objects in Run-Time Bytecode Specialization", Department of Graphics and Computer Science, University of Tokyo, ASIA-PEPM '02, Sep. 12-17, 2002, ACM, pp. 50-60.

Nathan Macrides, Security Techniques for Mobile Code "SANS Security Essentials (GSEC) Practical Assignment Version 1.4", Jul. 11, 2002, (11 pgs).

Dylan McNamee, et al., "Specialization Tools and Techniques for Systematic Optimization of System Software", Oregon Graduate Institute of Science & Technology, and University of Rennes/IRISA, ACM Transactions on Computer Systems, 2001 (30 pgs.).

Wen Li, et al., "Collaboration Transparency in the DISCIPLE Framework", CAIP Center, Rutgers—The State University of New Jersey, Piscataway, NJ, USA, Proceeding of the ACM International Conference on Supporting Group Work (Group '99) Nov. 14-17, 1999, Phoenix, AZ, (10 pgs.).

Jonathan Davies, et al., Proceedings of the 2nd international conference on "An Aspect Oriented Performance Analysis Environment", 10 pgs., 2003, Boston, Massachusetts Mar. 17-21, 2003.

Peter W. Gill, "Probing for a Continued Validation Prototype", a Thesis Submitted to the Faculty of the Worcester Polytechnic Institute, May 2001, (111 pages).

Geoff A. Cohen et al., "Automatic Program Transformation with JOIE", Paper, Department of Computer Science, Duke University, 12 pages.

Alan Snyder, "The Essence of Objects: Concepts and Terms", IEEE Software, Jan. 1993, pp. 31-42, Sunsoft, Mountain View.

Duke University, "The Java Object Instrumentation Environment", www.cs.duke.edu/ari/joie/, last updated May 2003, printed Sep. 28, 2006, 2 pages.

Ralph Keller et al., "Supporting the Integration and Evolution of Components Through Binary Component Adaptation", www.cs.ucsb.edu/oocsb, Sep. 9, 1997, Technical Report TRCS97-15, 12 pages.

Han Bok Lee, "BIT: Bytecode Instrumenting Tool" University of Colorado, Department of Computer Science 1997, 51 pages.

Markus Dahm, "Welcome to the Byte Code Engineering Library 4.4.1", http://bcel.sourceforge.net/main.html, last updated Apr. 12, 2002, 2 pages, printed Sep. 28, 2006.

Alphaworks, "Jikes Bytecode Toolkit: Overview", www.alphaworks.ibm.com/tech/jikesbt, posted Mar. 31, 2000, 2 pages, printed Sep. 28, 2006.

Nikolai Nikolov, "Execution of Modified Byte Code for Debugging, Testing And/Or Monitoring of Object Oriented Software", U.S. Appl. No. 10/749,617, filed Dec. 30, 2003, Office Action mailed Aug. 23, 2006. Copy of the Office Action, claims as they stood in the application prior to the mailing of the Office Action and a copy of the claims as they were presented in response to the Office Action.

Geoff A. Cohen et al., "Automatic Program Transformation with JOIE", Paper, Department of Computer Science, Duke University, 12 pages, 1998.

Alan Snyder, "The Essence of Objects: Concepts and Terms", IEEE Software, Jan. 1993, pp. 31-42, Sunsoft, Mountain View.

Duke University, "The Java Object Instrumentation Environment", www.cs.duke.edu/arl/joie, last updated May 2003, printed Sep. 28, 2006, 2 pages.

Ralph Keller et al., "Supporting the Integration and Evolution of Components Through Binary Component Adaptation", www.cs.ucsb.edu/oocsb, Sep. 9, 1997, Technical Report TRCS97-15, 12 pages.

Han Bok Lee, "BIT: Bytecode Instrumenting Tool" University of Colorado, Department of Computer Science 1997, 51 pages.

Markus Dahm, "Welcome to the Byte Code Engineering Library 4.4.1", http://bcel.sourceforge.net/main.html, last updated Apr. 12, 2002, 2 pages, printed Sep. 28, 2006.

Alphaworks, "Jikes Bytecode Toolkit: Overview", www.alphaworks,ibm.com/tech/jikesbt, posted Mar. 31, 2000, 2 pages, printed Sep. 28, 2006.

www.w3.org/TR/DOM-Level-2-Core/introduction.html *What is Document Object Model?*, Nov. 13, 2000, pp. 1-7.

www.cafeonleche.orge/books/xmljava/chapters/ch09.html Chapter 9, *The Document Object Model*, 2001, 2002, pp. 1-2.

www.cafeonleche.org/books/xmljava/chapters/ch09s04.html Chapter 9, *The document Object Model, Trees*, 2001, 2002, pp. 1-10.

www.cafeonleche.org/books/xmljava/chapters/ch09s05.html Chapter 9, *The Document Object Model DOM Parsers for Java*, 2001, 2002, pp. 1-3.

www.cafeonleche.org/books/xmljava/chapters/ch09x06.html Chapter 9, *The Document Object Model Parsing documents with a DOM Parser*, 2001, 2002, pp. 1-10.

www.caseonleche.org/books/xmljava/chapters/ch09s09.html Chapter 9, *The Document Object Model JAXP Serialization*, 2001, 2002, pp. 1-3.

Nikolai G. Nikolov, "Modification and Execution of Byetcode for Debugging, Testing and/or Monitroing of Virtual Machine Based Software", U.S. Appl. No. 10/750,050, filed on Dec. 30, 2003, Office Action mailed Nov. 1, 2006. Office Action, claims as they stood in the application prior to the mailing of the Office Action and claims as they were amended in response to the office action.

Nikolai G. Nikolov, "Byte Code Modification for Testing, Debugging and/or Monitoring of Virtual Machine Based Software", U.S. Appl. No. 10/750,067, filed on Dec. 30, 2003, Office Action mailed Jan. 16, 2007. Office Action, claims as they stood in the application prior to the mailing of the Office Action and claims as they were amended in response to the office action.

Nikolai G. Nikolov, "Excution of Modified Byte Code for Debugging, Testing and/or Mointoring of Object Oriented Software", U.S. Appl. No. 10/749,617, filed Dec. 30, 2003, Office Action mailed Jan. 18, 2007. Office Action and claims as they were amended in response to the office action.

Nikolai Nikolov, "Execution of Modified Byte Code for Debugging, Testing And/Or Monitoring of Object Oriented Software", U.S. Appl. No. 10/749,617, filed on Dec. 30, 2003, Office Action mailed Jul. 10, 2007.

Nikolai Nikolov, "Registration Method For Supporting Bytecode Modification", U.S. Appl. No. 10/749,686, filed on Dec. 30, 2003, Office Action mailed Jul. 3, 2007.

Office Action from U.S. Appl. No. 10/749,617, mailed Oct. 16, 2007, 18 pgs.

Response to Office Action from U.S. Appl. No. 10/749,617, mailed Dec. 10, 2007, 19 pgs.

Office Action from U.S. Appl. No. 10/749,686, mailed Nov. 16, 2007, 10 pgs.

* cited by examiner

| INVOKING METHOD | PLUG IN MODULE |
|---|---|
| (method_1)  $C_1, M_1, \text{args}_{11}$ | PIM_A |
| (method_2)  $C_1, M_2, \text{args}_{12}$ | PIM_A |
| (method_3)  $C_2, M_1, \text{args}_{21}$ | PIM_B |
| (method_4)  $C_3, M_1, \text{args}_{31}$ | PIM_A |

CLASSFILE CONVERSION INTO AN ORGANIZATION OF OBJECTS, AND MODIFICATION THEREOF, TO EFFECT BYTECODE MODIFICATION

Cross-reference is made to the following related patent applications, which is assigned to the same assignee as the present application:

U.S. patent application Ser. No. 10/750,066 filed on Dec. 30, 2003, titled "System and Method Employing Bytecode Modification Techniques For Tracing Services Within An Application Server" by Gregor K. Frey and Nikolai G. Nikolov. U.S. patent application Ser. No. 10/749,617 filed on Dec. 30, 2003, titled, "Execution of Modified Byte Code for Debugging, Testing and/or Monitoring Of Object Oriented Software" by Nikolai G. Nikolov. U.S. patent application Ser. No. 10/749,686 filed on Dec. 30, 2003, titled, "Registration Method For Supporting Bytecode Modification" by Nikolai G. Nikolov and Mario Kabadiyski. U.S. patent application Ser. No. 10/750,050 filed on Dec. 30, 2003, titled, "Modification and Execution of Bytecode For Debugging, Testing and/or Monitoring Virtual Machine Based Software" by Gregor K. Frey and Nikolai G. Nikolov. U.S. patent application Ser. No. 10/750,067 filed on Dec. 30, 2003, titled, "Byte Code Modification for Testing, Debugging and/or Monitoring Of Virtual Machined Based Software" by Nikolai G. Nikolov and Mario Kabadiyski. U.S. patent application Ser. No. 10/749,757 filed on Dec. 30, 2003, titled, "Application Tracing Service Employing Different Levels of Precision for Modifying Bytecode" by Nikolai G. Nikolov. U.S. patent application Ser. No. 10/750,160 filed on Dec. 30, 2003, titled, "Interfaces and Methods Employed Within A Bytecode Modification System" by Nikolai G. Nlkolov. U.S. patent application Ser. No. 10/749,740 filed on Dec. 30, 2003, titled, "Modified Classfile Registration With A Dispatch Unit That Is Responsible For Dispatching Invocations During Runtime Execution Of Modified Bytecode" by Nikolai G. Nikolov.

BACKGROUND

1. Field of the Invention

The field of invention relates generally to the software arts; and, more specifically, to classfile conversion into an organization of objects, and modification thereof, to effect bytecode modification.

2. Description of the Related Art

1. Bytecode

Certain software technologies, such a Java, emphasize the use of a special interpreter (which may also be referred to as a "virtual machine") that allows generic processor instructions to be executed on a particular type of processor. Here, each hardware platform (e.g., each computer) that the generic instructions are expected to "run on" typically includes a virtual machine that is responsible for converting the generic processor instructions (which are typically referred to as "bytecode") into instructions that are specially targeted for the hardware platform's particular processor(s). Software technologies that embrace the execution of bytecode on a virtual machine may be referred to as "virtual machine-based" software.

As a classic instance of the benefit of the Java virtual machine with respect to Internet usage, a first personal computer (PC) that is powered by an Intel processor may download from the Internet the same Java bytecode instructions as a second PC that is powered by a PowerPC processor. Here, the first PC's Java virtual machine converts the Java bytecode into instructions that are specific to an Intel processor while the second PC's Java virtual machine converts the same Java bytecode into instructions that are specific to a PowerPC processor. Thus, through the use of Java bytecode and processor specific Java virtual machines, an Internet server is able to maintain only a single type of code (the Java bytecode) without concern of client compatibility.

FIG. 1a demonstrates the standard compilation flow for generating instructions 105 targeted for a specific processor ("machine specific instructions" 105) from source code 101a, written according to a virtual machine-based language. According to the compilation flow of FIG. 1a, the source code 101a is converted into bytecode 103a by way of a first compiling process 102. The virtual machine then interprets 104 the bytecode into machine-specific instructions 105. The machine-specific instructions are then executed 106 to implement the methods originally articulated by the source code.

2. Object Oriented Programming and Classfiles

Certain software technologies, including Java, are "object oriented." According to an object oriented approach, the subject matter that is processed by a computer program is organized into classes of likeness. For example, the software used to sell items to customer X might belong to the same class of software (e.g., a class named "sales") that is used to sell items to customer Y. Here, given that a significant degree of overlap is expected to exist regarding the methods and data types used to process sales for both customers X and Y (e.g., an "update billing about sale" method, an "update accounting about sale" method, a "part number" data type, a "quantity" data type . . . etc.) it is deemed more efficient to organize such methods and data types into a generic "sales" class from which specific instances of the class (e.g., an instance for selling to customer X and an instance for selling to customer Y) can be defined and created.

Each specific instance of a class is referred to as an object; and, each object assumes the characteristics of the class from which it is defined. Thus, a first object could be created from the generic sales class to create a "sell to customer X" object; and, a second object could be created from the generic sales class to create a "sell to customer Y" object. Both objects would be able to execute the methods defined by the class. For example, the "sell to customer X" object could execute the "update accounting about sale" method to update an accounting department about a sale to customer X; and, the "sell to customer Y" object could also execute the "update accounting about sale" method to update an accounting department about a sale to customer Y.

In general, the runtime execution of any computer program can be viewed as the execution of a sequence of methods. With respect to an object-oriented approach, such a sequence of methods can be implemented by calling upon a sequence of objects and invoking one or more methods at each object. In order to invoke the method of an object, a representation of the object is typically created beforehand. In virtual machine-based object-oriented software environments, classfiles are bytecode level data structures from which such representations are created. A classfile can be viewed as a bytecode level description of a class; and, therefore, a classfile can be used as a template for the formation of an object, at the bytecode level, that is a member of the class. As specific methods can be attributed to specific classes, each classfile is made to contain the sequence of bytecode instructions that correspond to each of the class's specific methods.

FIG. 1b shows an embodiment of both a source code level class description 101b and a bytecode level class description (i.e., a classfile) 103b for the exemplary "sales" class referred to above. The source code level class description 101b of FIG.

1b corresponds to level 101a of FIG. 1a; and, the bye code level classfile 103b of FIG. 1b corresponds to level 103a of FIG. 1a. Referring to FIG. 1b, the source code level description of the "sales" class identifies the class's variables 107, such as part number (PN), quantity (QTY), per unit cost ($) and the customer's identity (CUSTOMER), and includes the class's methods such as GetMax 130, UPDATE ACCOUNTING 108, UPDATE BILLING 109, which are articulated as source code software routines.

Compilation 102 of the source code level class description 101b results in the formation of the bytecode level classfile 103b. Among other possible items not shown in FIG. 1b (e.g., rev codes, constant pools, . . . . etc), a classfile 103b may contain field information structures 110 for each of the class's variables and method information structures 131, 111, 112 that contain the bytecode level instructions 120b, 113, 112 for each of the class's methods. Both the source code level commands and the bytecode level instructions for the class's methods are illustrated in FIG. 1b as simple lines for illustrative convenience.

Over the course of discussion of various inventive aspects set forth in the detailed description that follows, comparisons will be made against each of FIGS. 1c and 1d. FIG. 1c illustrates, in more detail, exemplary Java source code level commands 120a and corresponding Java bytecode level instructions 120b for the "GetMax" method that was first presented in FIG. 1b. The "GetMax" method is designed to return the greater of two variables 'a' and 'b' (i.e., if 'a' is greater, 'a' is returned; if 'b' is greater, 'b' is returned).

Note that both the source code level and bytecode level implementations for the "GetMax" method have a single entry point 140a, 140b (i.e., the method starts at locations 140a, 140b) and a pair of exit points 141a, 142a and 141b, 142b (i.e., the method can end at locations 141a, 142a and 141b, 142b—noting that a "return" command/instruction causes an output to be presented; which, in turn, can be viewed as the completion of the method). Those of ordinary skill will be able to recognize that: (1) the source code level depiction 120a of the GetMax method observed in FIG. 1c articulates a method written in Java source code language that returns the greater of two values (i.e., a and b); and, likewise, (2) the bytecode level depiction 120b of the GetMax method observed in FIG. 1c articulates a corresponding method written in Java bytecode language that returns the greater of two values (i.e., the values a and b which are respectively loaded on the top of an operand stack by the initial "iload_0" and "iload_1" instructions).

A method having a single entry point 140 and a pair of exit points 141, 142, like the "GetMax" method, can be represented by depiction 150 where the top surface 140 corresponds to an entry point of the method and side edges 141 and 142 correspond to exit points. FIG. 1d shows a schematic representation of the process flow for an exemplary object oriented process. The exemplary process flow of FIG. 1d depicts four methods 205, 206, 207, 208 depicted similarly to the representation 150 observed in FIG. 1c (noting that method_3 207 has a structure that is identical to the structure 150 of FIG. 1c).

Entry points are depicted at the top surfaces 209, 210, 211, 212 of methods 205, 206, 207, 208; and, exit points are depicted as side ports of methods 205, 206, 207, 208 (i.e., side ports 213, 214, 215 for method_1 205; side ports 217, 218 for method_2 206; side ports 220, 225 for method_3 207; and, side ports 221, 222, 223, 224 for method_4 208) and bottom ports of methods 205, 206 and 208 (i.e., bottom port 216 for method_1 205; bottom port 219 for method_2 206; and, bottom port 226 for method_4 208).

According to the object oriented process flow depiction of FIG. 1d, a first object 201 is called in order to execute method_1205; then, a second object 202 is called in order to execute method_2 206; then, a third object 203 is called in order to execute method_3 207; then, a fourth object 204 is called in order to execute method_4 208. Each of the methods commence at their respective entry points 209, 210, 211, 212. Method_1 exits at a exit point 215, method_2 exits at exit point 217, method_3 exits at exit point 220; and, method_4 exits at exit point 221 endeavors.

3. Enterprise Systems

Traditional client-server systems employ a two-tiered architecture such as that illustrated in FIG. 2a. Applications 231 executed on the client side 230 of the two-tiered architecture are comprised of a monolithic set of program code including a graphical user interface component, presentation logic, business logic and a network interface that enables the client 230 to communicate over a network 233 with one or more servers 234. A database 232 maintained on one of the servers 234 provides non-volatile storage for the data accessed and/or processed by the application 231.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 232 includes data access logic used by the business logic to store and retrieve persistent data.

The limitations of the two-tiered architecture illustrated in FIG. 2a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

FIG. 10a shows an exemplary system comprised of an application server 1010 and a database server 1020. Application components 1011 executed on the application server 1010 may include, by way of example, presentation logic and business logic components. Within a J2EE environment, the presentation logic may contain servlets and Java Server Pages ("JSP") interpretable by browsers on clients 1000 (JSPs/Servlets generate hypertext markup language (HTML) which is interpreted by browsers), and the business logic may include Enterprise Java Bean ("EJB") components which are supported be EJB containers. However, as previously mentioned, the underlying principles of the invention are not limited to a Java implementation.

This separation of logic components and the user interface provides a more flexible and scalable architecture compared to that provided by the two-tier model. For example, the separation ensures that all clients 230 share a single implementation of business logic 244. If business rules change, changing the current implementation of business logic 244 to a new version may not require updating any client-side program code. In addition, presentation logic 242 may be provided which generates code for a variety of different user interfaces 240, which may be standard browsers such as Internet Explorer® or Netscape Navigator®.

The multi-tiered architecture illustrated in FIG. 2*b* may be implemented using a variety of different object-oriented application technologies at each of the layers of the multi-tiered architecture, including those based on the Java 2 Enterprise Edition™ ("J2EE"). In a J2EE environment, the business layer 244, which handles the core business logic of the application, is comprised of Enterprise Java Bean ("EJB") components with support for EJB containers. Within a J2EE environment, the presentation layer 242 is responsible for generating servlets and Java Server Pages ("JSP") interpretable by browsers at the user interface layer 240 (e.g., browsers with integrated Java virtual machines).

Although the multi-tiered system illustrated in FIG. 2*b* provides a more flexible and scalable architecture, it also results in significant additional complexity. For example, monitoring, testing and/or debugging multiple clusters of presentation layer servers, business layer servers and databases, and the dependencies between them requires a significant amount of management overhead. As such, the ability to efficiently monitor, test and/or debug object-oriented, virtual-machine-based enterprise software, such as the software employed in a J2EE environment, is critical for efficient software development and/or implementation.

SUMMARY

A classfile modification method is described. The classfile modification method entails converting a classfile into a collection of objects whose organization is derived from the classfile's organization. The collection of objects comprise unique objects for each method information structure found in the classfile. Each of the unique objects reference other objects in the organization. The other objects represent their corresponding unique object's method information structure's byte code instructions. The classfile modification method also entails adding at least one additional other object to an arrangement of other objects that are referenced to a unique object. The at least one additional other object corresponds to at least one byte code instruction that causes a plug-in module's handler method to provide output function treatment for the unique object's method. The classfile modification method also entails converting the resulting collection of objects into a modified version of the classfile.

BRIEF DESCRIPTION OF THE DRAWINGS

A better understanding of the present invention can be obtained from the following detailed description in conjunction with the following drawings, in which:

FIG. 7 shows an embodiment of an architectural perspective for dispatch unit software that interfaces between bytecode modified methods and plug in handlers;

DETAILED DESCRIPTION OF PREFERRED EMBODIMENTS

1.0. Architectural Overview

Figure 3:
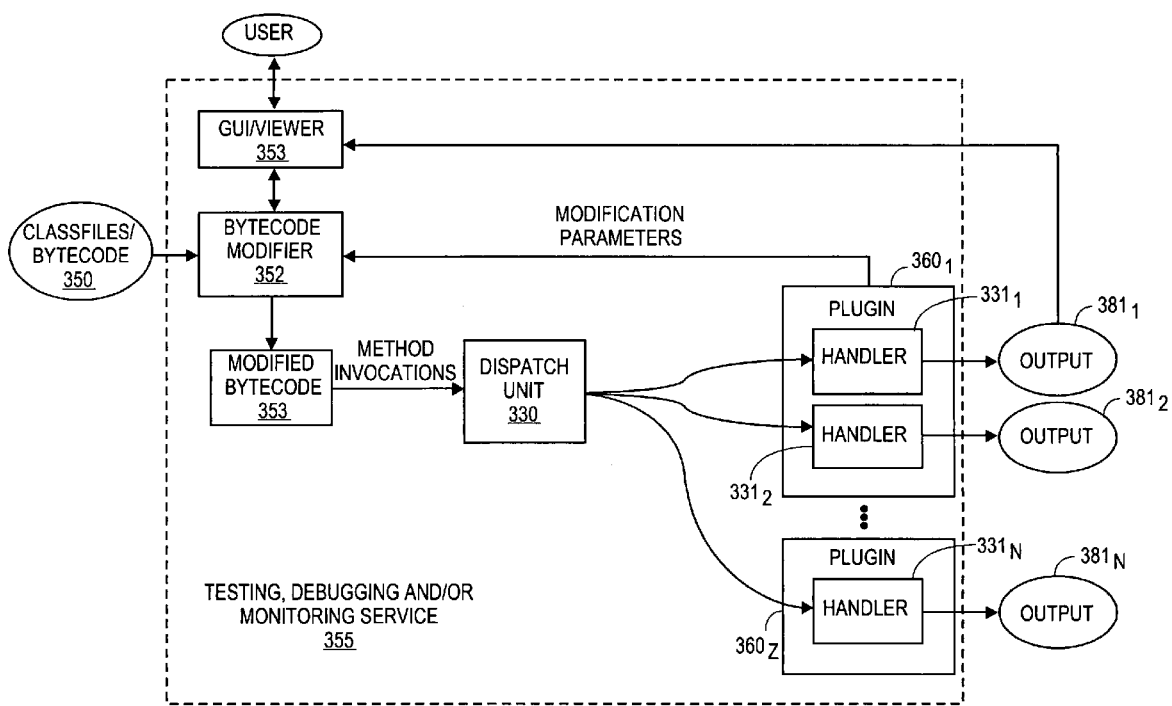
FIG. 3 illustrates a system architecture that embraces bytecode modification.
Figure 4A:
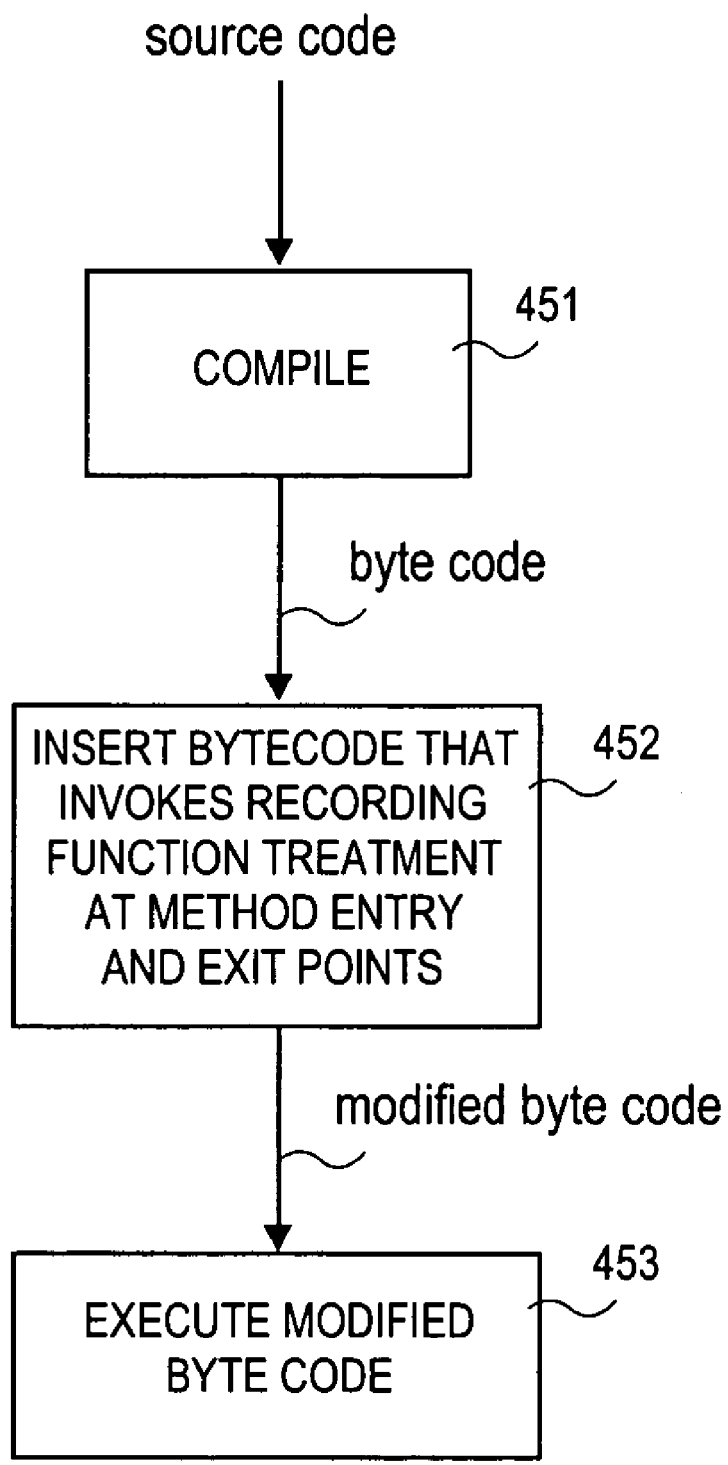
FIG. 4*a* shows a method that modifies bytecode in order to support software debugging and/or monitoring.
Figure 4B:
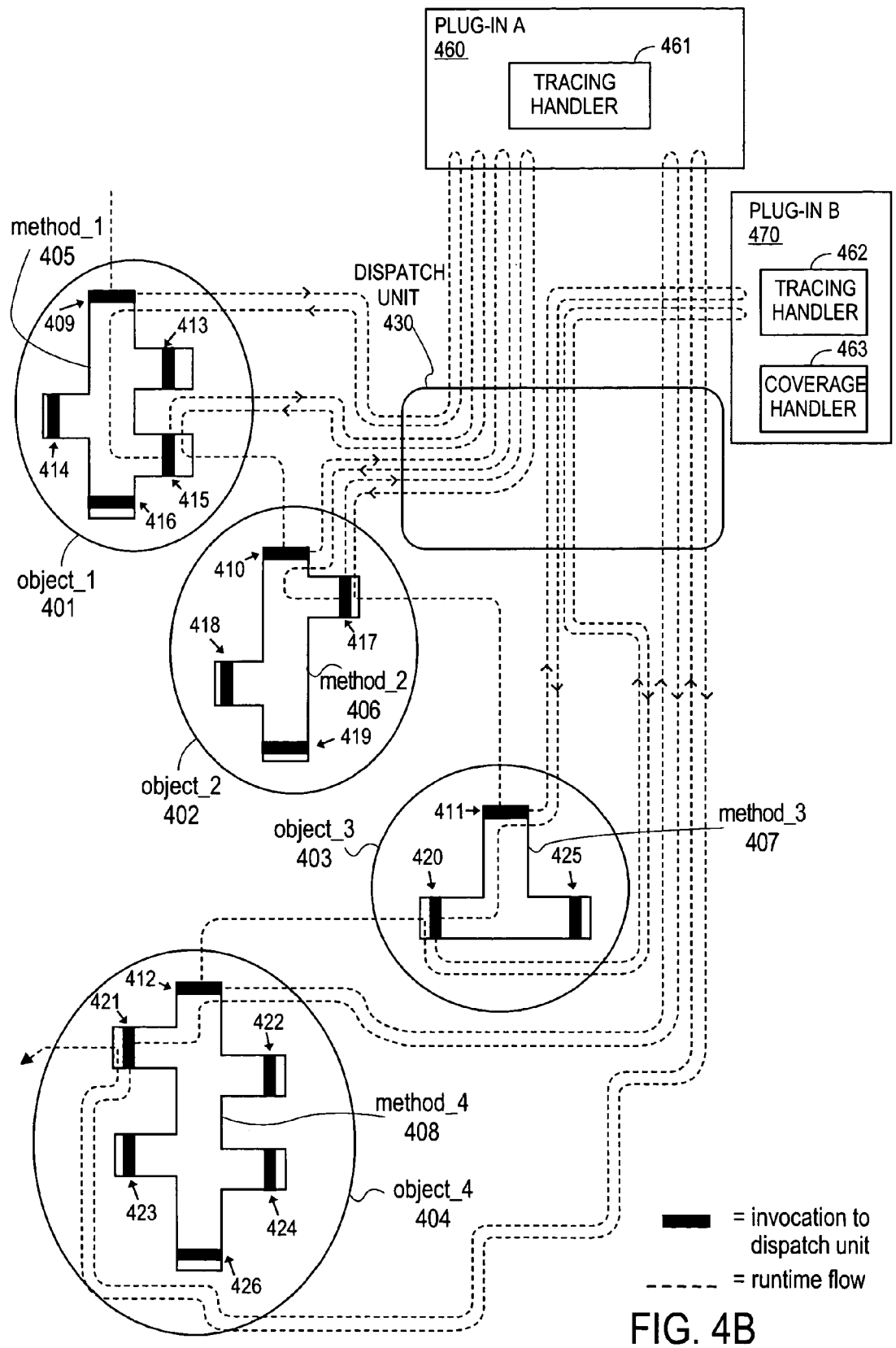
FIG. 4*b* shows an example of the runtime execution of object oriented software having modified bytecode for purposes of "application tracing" or debugging or "application coverage" monitoring.

FIG. 3 and FIGS. 4*a–b* describe techniques that can be directed to the testing, debugging and/or monitoring of sophisticated object-oriented virtual machine-based software. Throughout the description, for the purposes of explanation, numerous specific details are set forth in order to provide a thorough understanding of the present invention. It will be apparent, however, to one skilled in the art that the present invention may be practiced without some of these specific details. For example, while the embodiments described below focus on a Java environment in which Java "bytecode" is processed by a Java "virtual machine," various underlying principles may be implemented in interpreted-code and non-interpreted-code environments as well as object oriented and non-object oriented environments.

FIG. 3 illustrates an embodiment of a service 355 capable of testing, debugging and/or monitoring the bytecode 350 of a sophisticated "enterprise" software platform. The service includes a bytecode modifier module 352 for inserting function calls at entry points and exit points of certain specified methods of the bytecode 350, to generate modified bytecode 353. As described in greater detail below, the bytecode modifier module 352 may modify the bytecode 350 prior to runtime (see, e.g., FIG. 4a and associated text). In this embodiment, each function call inserted into the modified bytecode 353 invokes a dispatch unit 330; which, in turn, is responsible for directing the direction of the runtime process flow to one or more appropriate plug-in modules (e.g., any one or more of the plug-in modules $360_1$ through $360_Z$). In an embodiment, the plug-in modules $360_1$ through $360_Z$ each include corresponding plug-in handlers $331_1$–$331_N$. The handlers $331_1$–$331_N$ can often be viewed as grains of executable code that output information $381_1$–$381_N$ related to the operation of the original software 350. Plug-in modules can be viewed as wrappers for the grains of handler code.

Developers, based on their particular testing, debugging and/or monitoring needs, may customize design and implement plug-in modules. This modular plugin architecture provides a flexible and scalable solution for evaluating program code, and may be particularly useful for evaluating program code on large enterprise platforms (e.g., such as J2EE-based platforms).

One particular type of function performed by a plug-in handler is an output function that records one or more properties about the method and/or causes one or more properties associated with the method to be recorded. For example, one type of output function performed by a plug-in handler (e.g., plug-in handler $331_1$) involves recording the time that each method started at an entry point and/or exited at an exit point. Developers may use this recorded timing information to determine, for example, the sequence of methods just prior to a "crash" of the software. Similarly, if a particular method or sequence of methods take an inordinate amount of time to complete, the developer may determine the reasons why and/or change the program code to operate more efficiently. As such, the recording of when method entry points and method exit points are reached allows a precise method history sequence to be reconstructed.

In addition to timing information, the parameters that are passed to a method when it starts (e.g., its input parameters) and/or the parameters that are passed by a method when it exits (e.g., its output/returned values) may also be recorded by a plug-in handler to enhance the recorded history of the execution flow (e.g., a returned value or a thrown exception). For example, applications may often crash because of an incorrect or incompatible parameter value. By recording parameter values that are passed in and out of the application's methods over the course of the application's execution flow, the appearance and/or source of an incorrect/incompatible parameter value can be readily flagged.

Thus, not only can start/stop times be recorded on a method-by-method basis; but also, parameters can be recorded on a method-by-method basis. Of course, the identity of the methods themselves may also be recorded. A plug-in handler that records the start and/or end times of a method and/or records the parameter flow in and/or out of a method may be referred to as a "tracing" plug-in handler because aspects of the method history of a software routine can be "traced" through the recordation of its method start/end times and its method parameter values.

Another type of output function that may be performed by a plug-in handler (e.g., plug-in handler $331_2$) involves maintaining a counter for each bytecode modified method and incrementing the counter each time its corresponding method is used (e.g., incrementing the counter for a bytecode modified method each time the bytecode modified method makes a function call to the dispatch unit 330 from its entry point). As applications (and, in particular, enterprise applications) involve complicated "logic," cross-method interdependencies, etc., it is possible that certain sections of code are never executed (i.e., are "dead" or "unreachable") or are almost never executed because of a flaw in the design of the application.

Counting each time a method is used allows dead/unreachable or hardly used regions of the software to be readily identified. In addition, for monitoring purposes, counting each time a method is used allows a software manager to comprehend "usage" rates of the software's individual methods. A plug-in handler that is capable of maintaining a counter for an individual method may be referred to as a "coverage" plug-in handler because the frequency of usage of various regions of the software can be gauged by counting each time a method is used. In related embodiments, a single coverage plug-in handler may be designed to maintain separate counters for a plurality of methods.

In the examples described herein, the various functional components illustrated in FIGS. 3 and 4b operate together as a service (e.g., a J2EE service) which may be used by programmers and/or developers to test, debug and/or monitor program code on an enterprise network using bytecode modification techniques.

2.0. Modified Byte Code Runtime Flow

FIG. 4a shows one embodiment of a compilation and execution methodology for the bytecode modification strategy outlined above. According to the methodology of FIG. 4a, the source code of an object-oriented virtual machine-based software technology (e.g., Java) is compiled 451 into its corresponding bytecode. The bytecode is then modified 452 by inserting additional bytecode instructions at method entry and exit points. The additional bytecode instructions invoke (e.g., make a function call to) a dispatch unit such as the dispatch unit 330, 430 illustrated in FIGS. 3 and 4b.

Once the methods to be modified have been modified 452, the modified bytecode is executed 453 with the help of a virtual machine interpreter. The execution of the bytecode may also be referred to as "runtime". During runtime 453, as explained in more detail further below, the dispatch unit 330, 430 responds to each invocation from a modified method by ensuring that the runtime execution process flows to the appropriate plug-in(s) for the invoking method. As a consequence, the invocations made to the dispatch unit 330, 430 cause the appropriate plug-in handler(s) to perform their designated functions (e.g., such as the output functions described above). Note that each plug-in handler can be viewed as including a specialized body of instructions that, when executed, cause the plug-in handler's particular function to be performed.

Figure 1A:
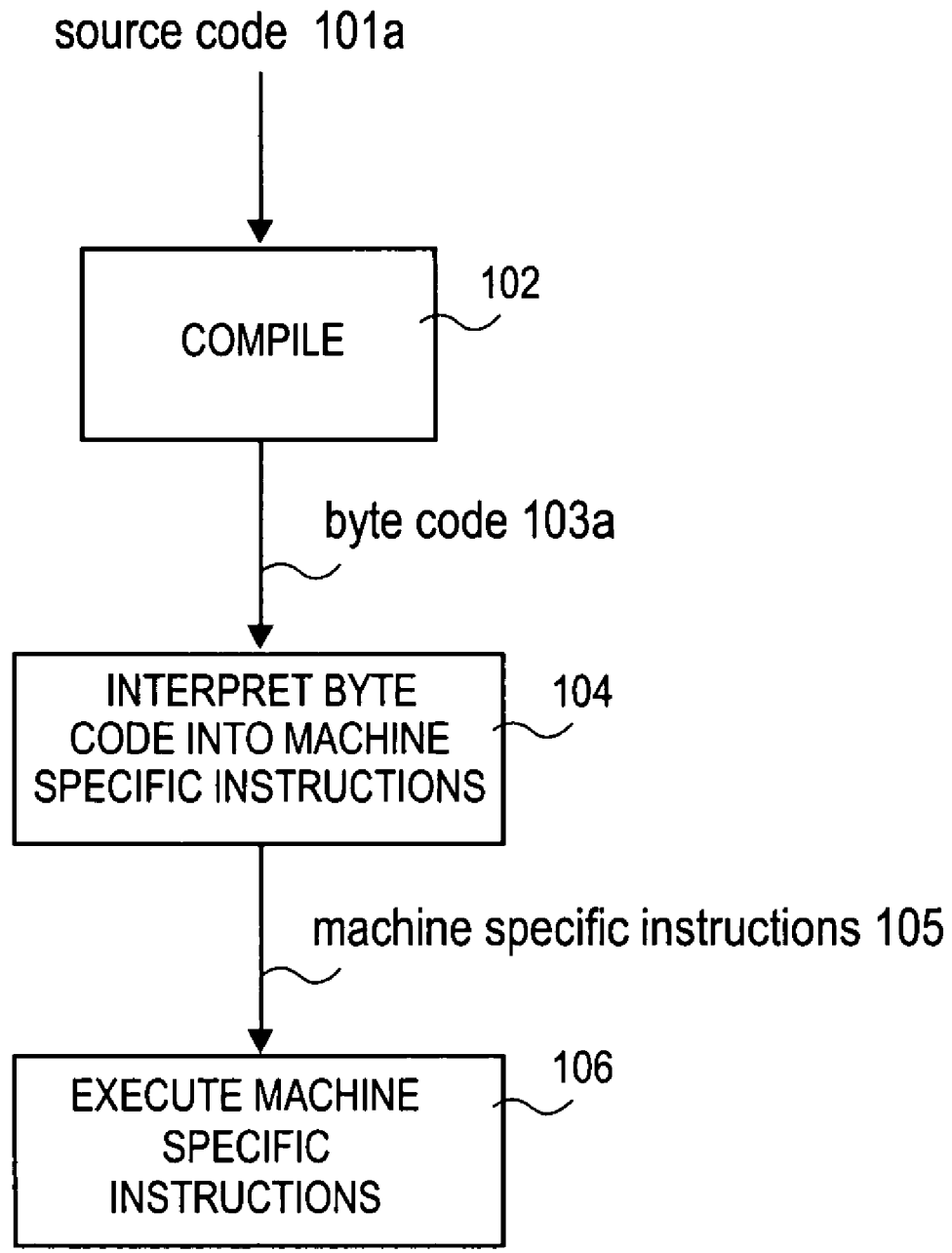
FIG. 1*a* shows a compilation process that involves bytecode level coding.
Figure 1B:
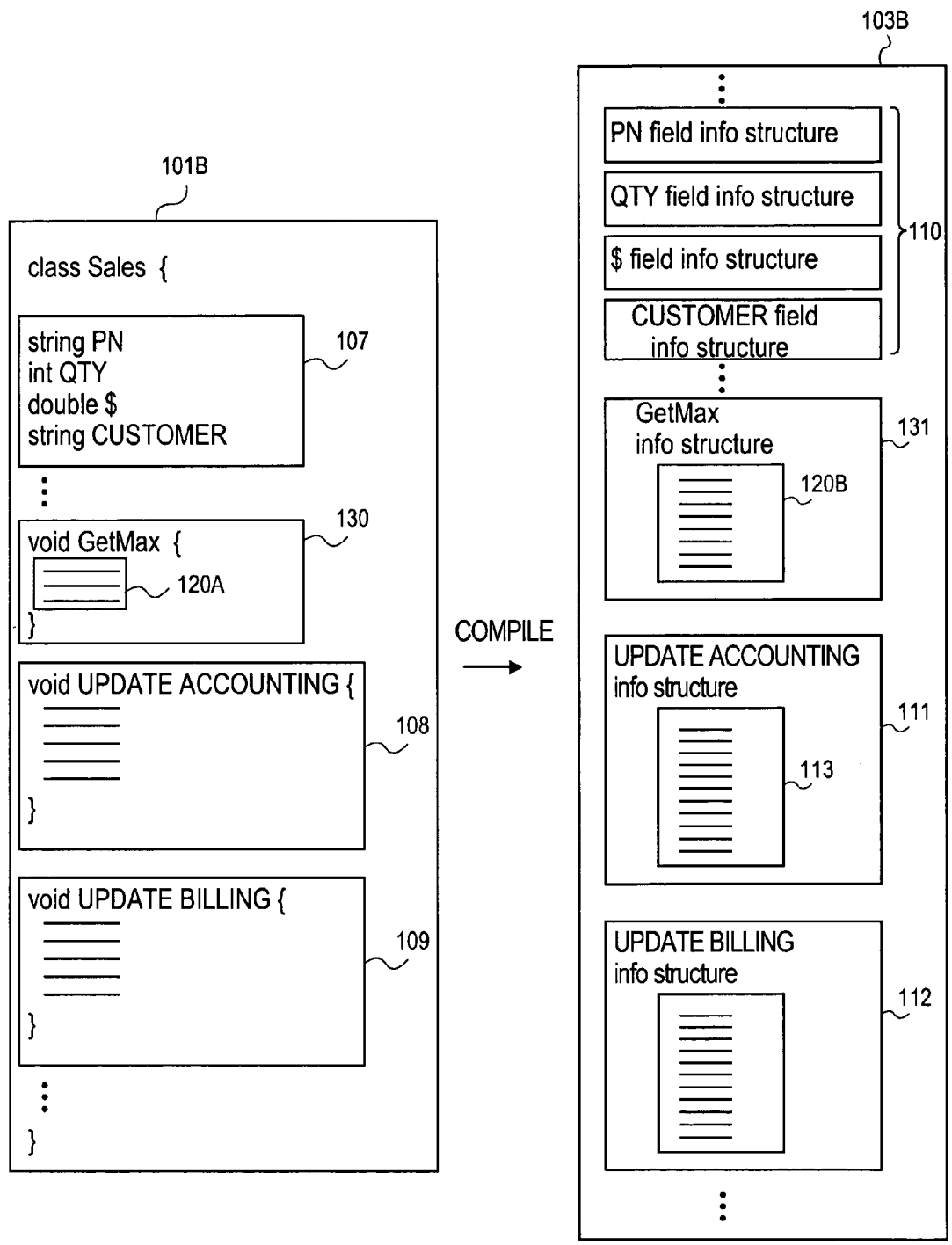
FIG. 1*b* shows an embodiment of a source code level class description and an embodiment of a bytecode level class description.

For the purpose of illustration, one example of system operation is set forth in FIG. 4b. Like FIG. 1d, FIG. 4b shows a schematic representation of a process flow for an exemplary object-oriented process. However, in contrast to FIG. 1d, FIG. 4b graphically illustrates each of the bytecode modified methods 405 through 408 invoking the dispatch unit 430 at the their corresponding entry point (i.e., entry points 409 through 412) and exit point (i.e., exit points 413 through 426).

Thus, as a consequence of the bytecode modification, for a process flow that performs the substantive equivalent of that observed in FIG. 1d (i.e., from object_1/method_1 401/405 to object_2/method_2 402/406 via exit point 415 of method_1 405; from object_2/method_2 402/406 to object_3/method_3 403/407 via exit point 417 of method_2 406; from object_3/method_3 403/420 to object_4/method_4 404/408 via exit point 420 of method_3 407; and, exiting from exit point 421 of method_4 408), the process flow is directed from each method entry and exit point to the dispatch unit 430. The dispatch unit 430 then causes the runtime process flow to flow to an appropriate plug-in handler for each method whose corresponding handlers perform their designated function, as described herein.

Note that as bytecode modifications are made at each entry and exit point for each of methods 405–408, the associated plug-in handlers may still record information for each of methods 405–408 even if the runtime process flow were to flow through a different set and/or sequence of method entry and exit points than those observed in FIG. 4b.

In the particular example illustrated in FIG. 4b, methods 405, 406 and 408 have been configured to receive "tracing" treatment by plug-in module A 460; and, only method 407 is configured to receive both "tracing" treatment and "coverage" treatment by plug-in module B 470. As such, the process flow for methods 405, 406 and 408 involves from each of their respective entry 409, 410, 412 and exit 415, 417, 421 points: (1) invoking the dispatch unit 430; (2) dispatching the invocation to plug-in module A 460; (3) executing tracing method(s) with the handler 461 of plug-in module A 460 (e.g., record a start time and/or input parameters identified with the invoking method if the invoking method is invoking from an entry point; or, record an end time and/or output parameters and/or returned value identified with the invoking method if the invoking method is invoking from an exit point); and, (4) returning back to the entry or exit point that made the original invocation.

By contrast, the process flow for method 407 involves from its entry 411 and exit 420 points: (1) invoking dispatch unit 430; (2) dispatching the invocation to plug-in module B 470; (3) executing tracing method(s) with handler 462 (i.e., record a start time and/or input parameters if invocation is from entry point 411; or, record an end time and/or output parameters if invocation is from exit point 420); (5) executing coverage method(s) with handler 463 (i.e., increment a counter maintained for method_3 407) and, (5) return back to the entry or exit point that made the original invocation.

The above example demonstrates that the embodiment of the dispatch unit 430 referred to above is responsible for being conscious of an appropriate plug-in module for each invoking method and causing the runtime process flow to be directed to the appropriate plug-in module for each invoking method. As observed in FIG. 4b, the same plug-in module (e.g., plug-in module 460) may be "re-used" across a plurality of methods (e.g., methods 405, 406 and 408); and, some plug-in modules may contain only a single handler (such as plug-in module 460) while others may contain more than one handler (such as plug-in module 470). Moreover, as described in more detail below, more than one plug-in module may be associated and dispatched to from the entry point and/or exit point of a single method.

Note that appropriate coverage monitoring may be gained by the coverage plug-in handler 463 at either a method's entry point or a method's exit point (e.g., rather than executing the coverage plug-in handler 463 at both the method's entry and exit points as suggested by FIG. 4b). That is, as the coverage plug-in handler 463 counts each time method 407 is used, a proper count may be determined by incrementing the counter maintained for method 407 only when method 407 starts (i.e., coverage is triggered at entry point 411); or, only when method 407 ends (i.e., coverage is triggered at exit point 408). In one embodiment, coverage is triggered at entry point 411 to ensure that the count that is maintained for method 407 is accurate even if the software happens to crash during execution of method 407.

Figure 5A:
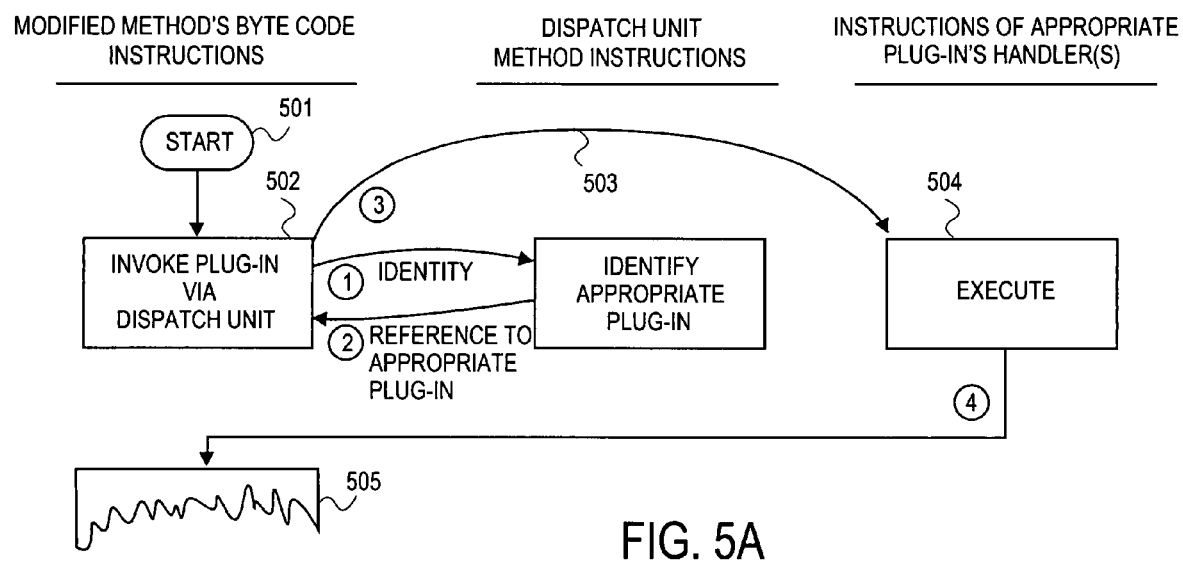
FIG. 5*a* shows a runtime depiction of debugging/monitoring software having bytecode modification at a method entry point.
Figure 5B:
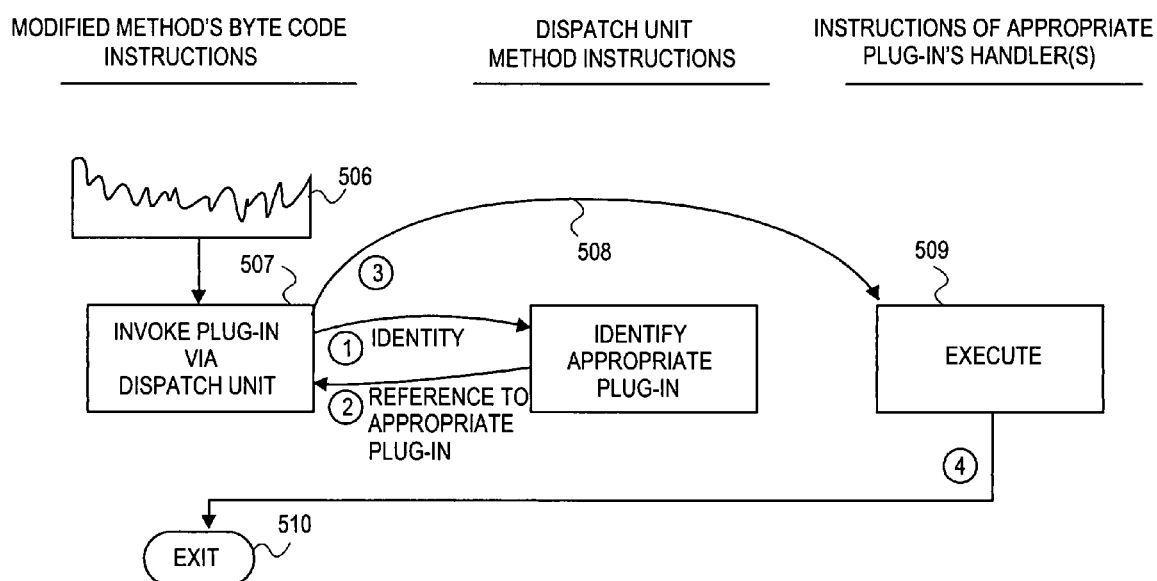
FIG. 5*b* shows a runtime depiction of debugging/monitoring software having bytecode modification at a method exit point.

FIGS. 5a and 5b illustrate one embodiment of the interaction between the dispatch unit and an invoking method. Specifically, FIG. 5a depicts an embodiment of an invocation stemming from a modification made at a method's entry point and FIG. 5b depicts an embodiment of an invocation stemming from a modification made at a method's exit point. According to the methodology of FIG. 5a, a bytecode modified method starts 501 (e.g., by having another method invoke it) and an initial block of bytecode-level instructions 502 corresponds to the modification that invokes the dispatch unit. Alternate embodiments may choose (for whatever reason) to insert the block of instructions for invoking the dispatch unit deeper down into the instructions that are inevitably executed once the method starts.

In response to the invocation, the dispatch unit 430 identifies the appropriate plug-in module for the method through recognition of the invoking method (e.g., by way of a class ID and a method ID) and causes the process flow to be dispatched to an appropriate plug-in module 503 by returning a reference to the appropriate plug-in module for the invoking method (e.g., a reference to an object that the plug-in module corresponds to). The invoking method uses the reference to call upon the plug-in module; which, in turn, causes the plug-in module's handler method(s) to be executed. The handler(s) execute their recordation method(s) 504; and, the process flow returns to the remainder of the invoking method's instructions 505. In the case of FIG. 5a where the first block of bytecode-level instructions 502 in the modified method are for invoking the dispatch unit, the first instruction in the remainder of the invoking method's instructions 505 may be the first instruction generated for the method by the standard source code-to-bytecode compilation 451 process (i.e., the first instruction of the method prior to modification).

According to the methodology of FIG. 5b, a bytecode-modified method can exit 510 as a consequence of various events (e.g., the method calculates a value to be returned, the method invokes another method, etc.). In the particular embodiment of FIG. 5b, the block of bytecode level instructions 507 that correspond to the modification that invokes the dispatch unit is located just prior to an instruction 510 that corresponds to an exit from the method. Alternate embodiments may choose (for whatever reason) to insert the block of instructions that invoke the dispatch unit at a point deeper up into the method's sequence of instructions that are inevitably executed if the method is to reach the exit point 510.

In response to the invocation at the method's exit, the dispatch unit identifies the appropriate plug-in module for the method through recognition of the invoking method and provides back to the invoking method a reference to the appropriate plug-in module. The invoking method uses the reference to call the appropriate plug-in module 508. The plug-in module's handler(s) execute their recordation method(s) 509; and, the process flow returns to exit the method.

3.0. Example of Modified Bytecode

Figure 1C:
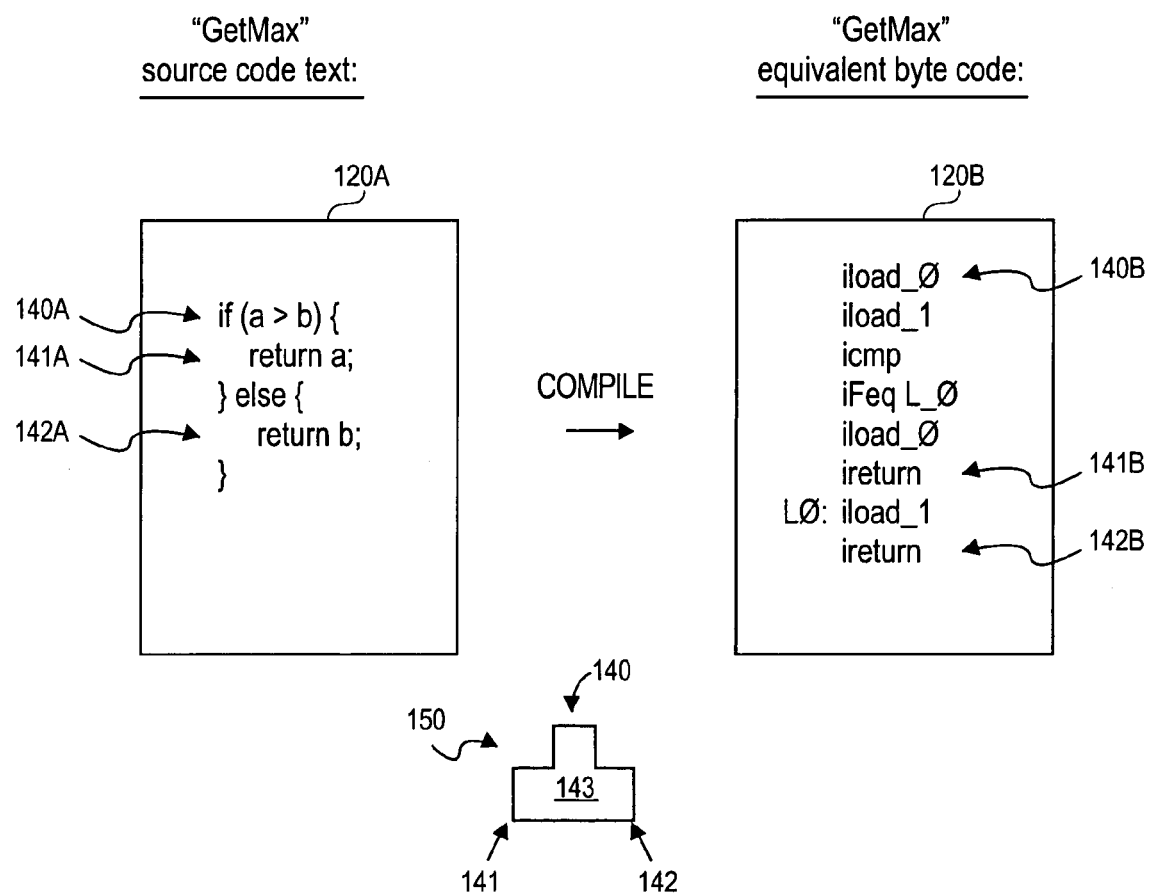
FIG. 1*c* shows an embodiment of coding for a method at the source code level and an embodiment of coding for a method at the bytecode level.
Figure 1D:
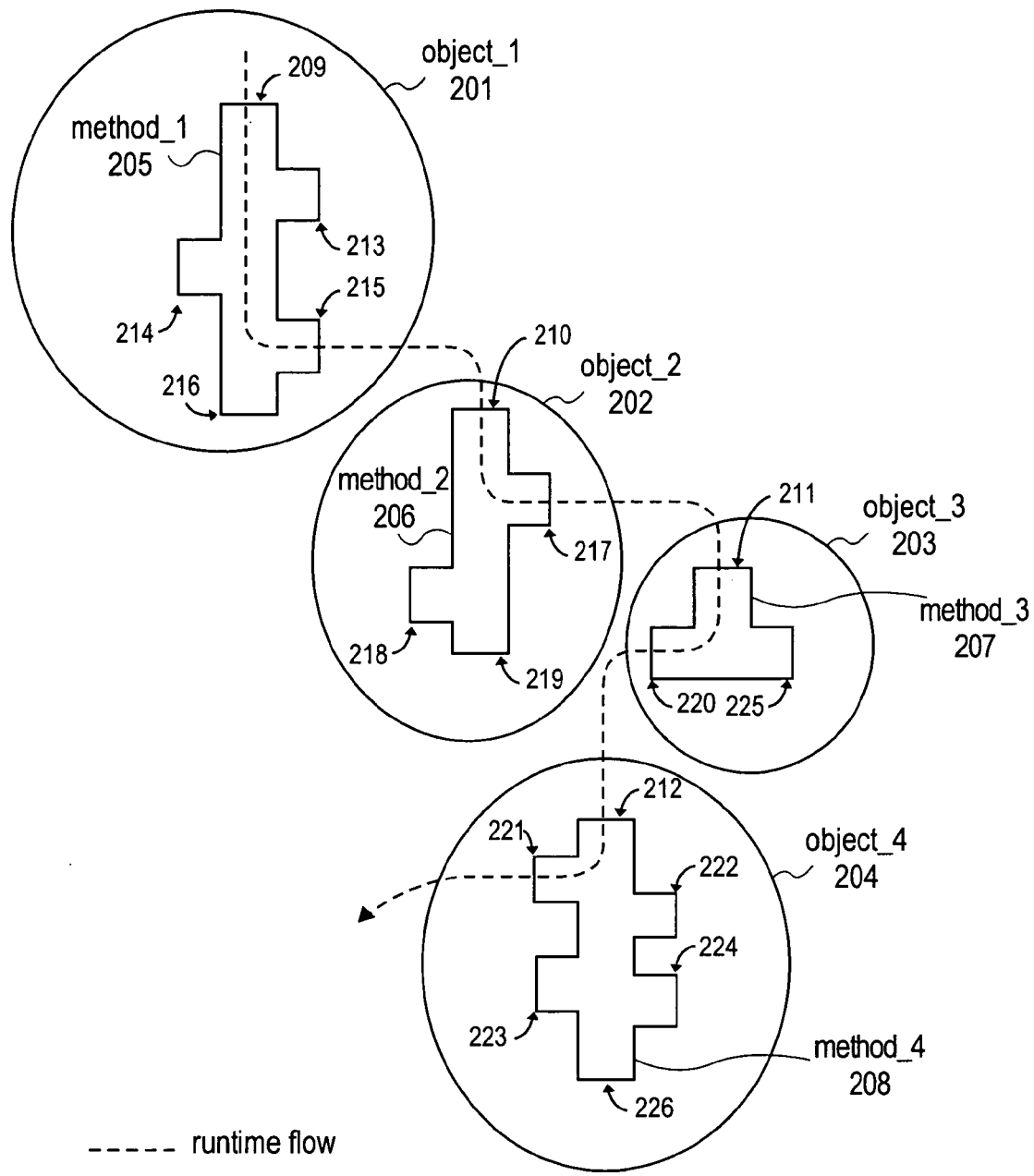
FIG. 1*d* shows an exemplary depiction of the runtime execution of an object oriented programming language.
Figure 2A:
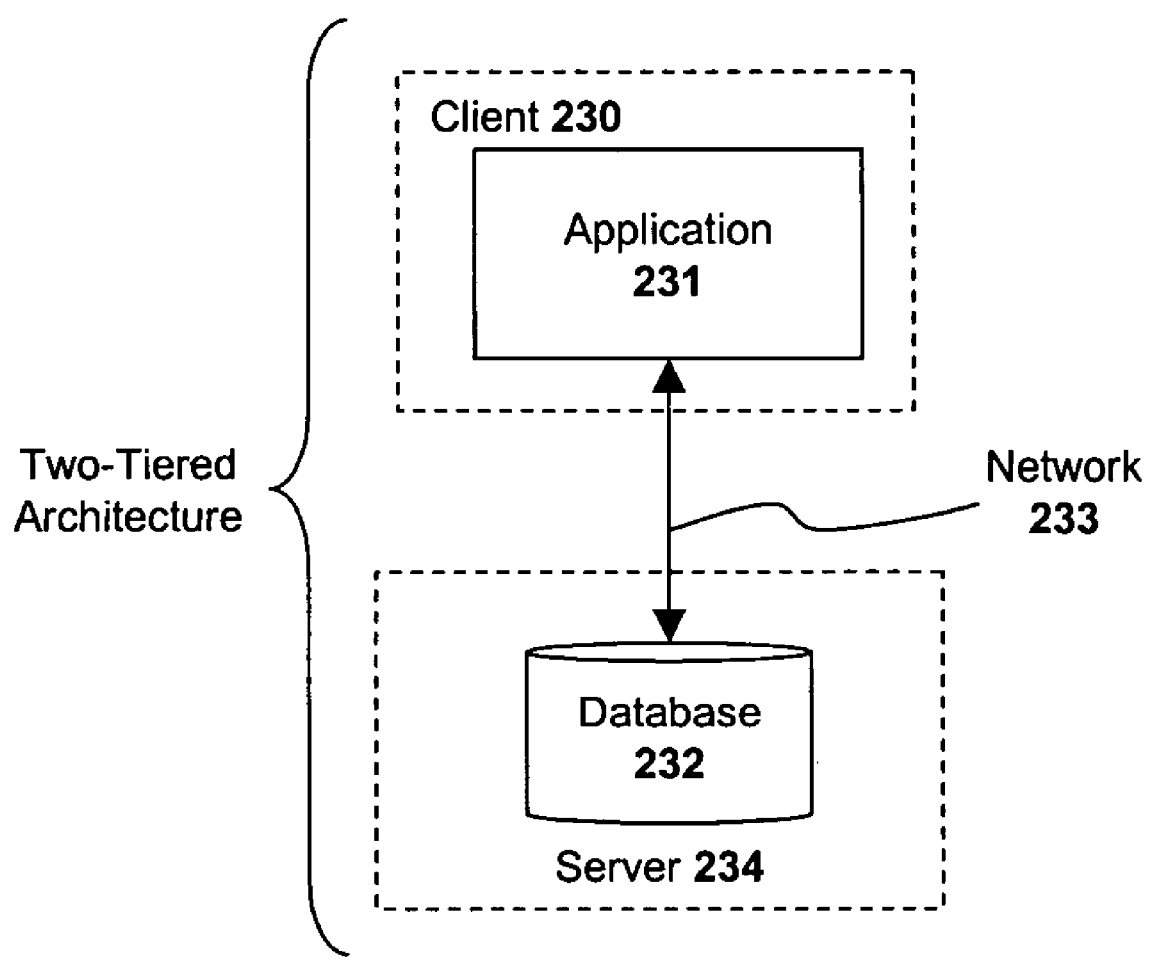
FIG. 2*a* illustrates a traditional two-tier client-server architecture.
Figure 2B:
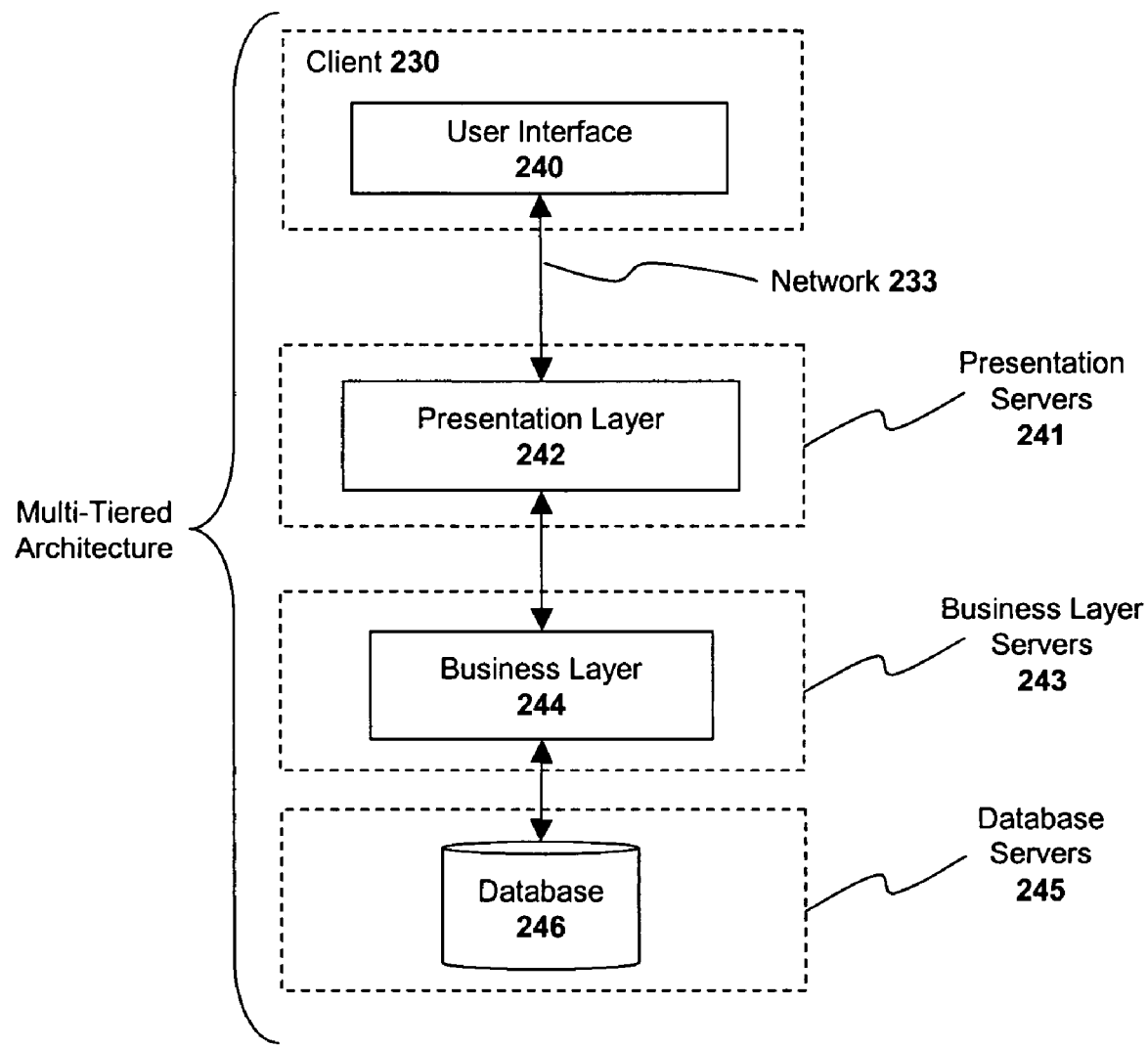
FIG. 2*b* illustrates a multi-tier client-server architecture implemented on an enterprise network.
Figure 6A:
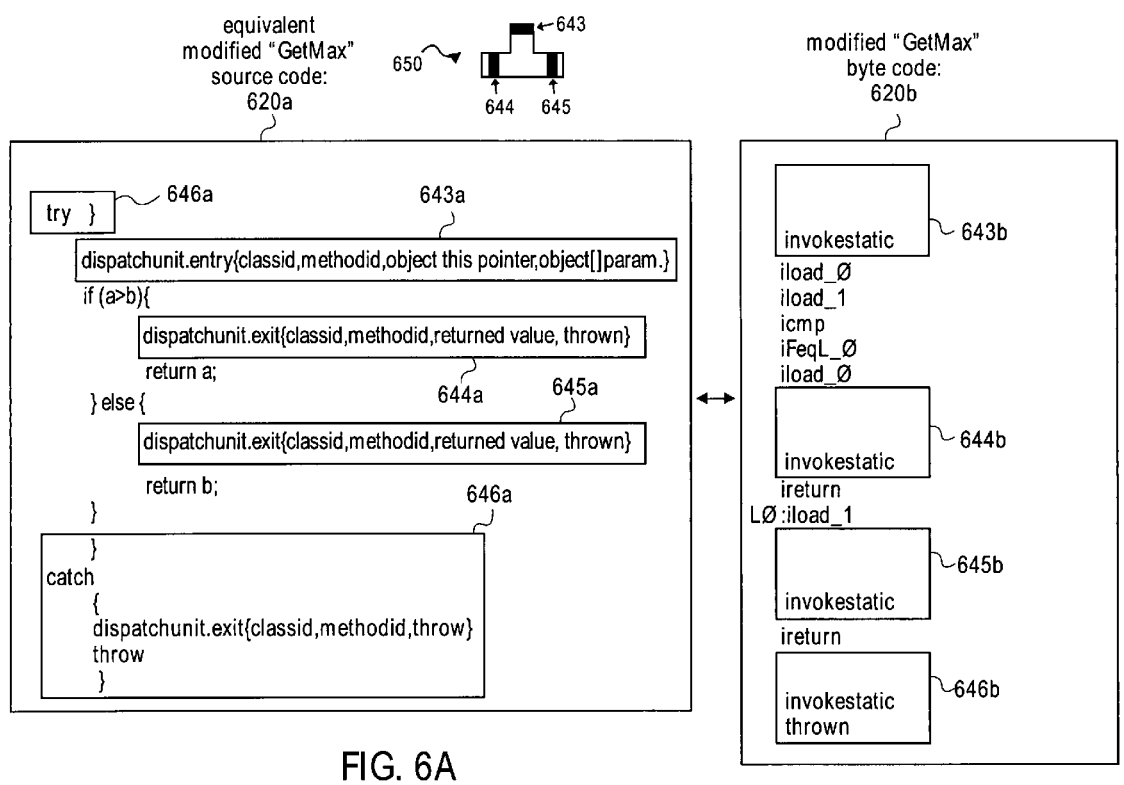
FIG. 6*a* shows an embodiment of coding, at the source code and bytecode levels, for a method that has been modified for debugging and/or monitoring purposes.

FIG. 6a illustrates a "bytecode modified" version 620b of the bytecode level "GetMax" method 120b that was originally shown in FIG. 1c. That is, the bytecode modified version 620b of FIG. 6a can be viewed as a result of running the instructions for the "GetMax" method 120b through the bytecode modification process 452 of FIG. 4a. Note that a schematic representation of the modified "GetMax" method 650 (where blocks 643b, 644b, 645b and 646b represent the additional bytecode instructions) is also shown in FIG. 6a and may be compared with the "GetMax" structure 150 originally shown in FIG. 1c for the purpose of illustration.

For additional information and ease of understanding, an equivalent source code method 620a that could be compiled to directly produce the bytecode modified 620b version is also shown in FIG. 6a. The equivalent source code method 620a has been provided because source code syntax is generally considered easier to follow than bytecode syntax. It should be realized, however, that the equivalent source code 620a need not be generated for complying with the underlying principles of the invention (i.e., only bytecode-level methods, such as bytecode level method 620b, may be used for modification purposes).

Comparing the pre-modification bytecode method 120b of FIG. 1c with the post modification bytecode method 620b of FIG. 6a, note that additional blocks of instructions 643b, 644b, 645b and 646b have been introduced by the bytecode modification process 452. Recalling that the modification process involves adding instructions that invoke the dispatch unit 430, and that the code observed in FIG. 1c and FIG. 6a are written in the Java language, each of the additional blocks of instructions 643b, 644b, 645b and 646b correspond to blocks of bytecode-level instructions that are designed to at least invoke the dispatch unit 430.

FIG. 6a, as an example, shows an "invokestatic" instruction being associated with each block of additional instructions. In the Java bytecode language, the "invokestatic" instruction is used to invoke a static method of a particular class. A static method is a method that belongs to a particular class but does not require an object of the class to be called upon in order for the method to be executed. Accordingly, use of the invokestatic instruction suggests that the dispatch unit 430 of FIG. 4 may be constructed as a class (e.g., a "dispatch" class) having static methods that are invoked by the modified methods. Note that other approaches are possible so that the dispatch unit methods need not be static methods while still complying with the underlying principles of the invention. For example, the invoked methods may be associated with called upon objects (in which case, for Java applications, "invokevirtual" or "invokespecial" invoking instructions may be used).

Blocks of instructions 643b through 646b are shown in FIG. 6a because, typically, some instruction level processing is performed prior to a jump to an invoked method. This pre-processing helps "set up" the process flow jump. For example, methods typically require input parameters (which may also be referred to as "arguments") that are used as a basis for execution. At the bytecode level, the arguments for invoking the dispatch unit's methods should be suitably prepared just prior to the actual invocation instruction (e.g., an invokestatic instruction).

This may involve, for example, the placing of these arguments on top of an operand stack. In a further embodiment, because the dispatch unit 430 may also be geared to recognize the invoking method based upon (at least in part) the invoking method's own arguments, the additional instruction-level processing that sets up the invocation to the dispatch unit may also create an object made to contain the invoking method's own arguments (note that this same object may then be used by a plug-in module's handler to record the invoking method's arguments at the time the method starts). Regardless of how the arguments for the dispatch unit's methods are prepared, the procedures for doing so require the execution of instructions; and, therefore, modifying a bytecode-level method with invocations to another method typically requires additional instructions, per invocation, beyond each specific invocation instruction (e.g., beyond each added invokestatic instruction).

Because invocations to the dispatch unit are made from modified method entry and exit points, FIG. 6a shows the bytecode modification as the insertion of instruction blocks at the entry and exit points of the method 620b. With respect to the exit points, instruction block 644b is placed at the exit caused by the value "a" being returned; and instruction block 645b is placed at the exit caused by the value "b" being returned (recalling that the method is designed to return whichever of a and b is the greater value). Because (for purposes of illustrative convenience) the variable stack values for the bytecode level methodology 620b of FIG. 6b have not been provided, the parameters associated with the inserted instruction blocks 643b, 644b that invoke the dispatch unit are better understood by referring to the equivalent source code syntax 620a.

Note that two different methods of the dispatch unit are invoked: dispatchunit.entry 643a and dispatchunit.exit 644a, 644b. Here, the dispatchunit.entry method 643a is invoked for those invocations made from a method entry point; and, the dispatchunit.exit method 644a is invoked for those invocations made from a method exit point. Invoking different methods depending on whether the method is at an entry point or exit point allows for different or customized dispatch unit responses depending on whether the method resides at an entry or exit.

Other possible differences between the entry and exit method embodiments referred to in FIG. 6a may be recognized by focusing on the differences in their arguments. Specifically, note that the embodiment of the .entry method 643a includes the following arguments:

1. classid;
2. methodid;
3. object this pointer; and,
4. object [ ] param.

By contrast, the embodiments of the exit methods 644a, 645a include the following arguments:

1. classid;
2. methodid;
3. returned value
4. thrown exception [which is normally null, and becomes non-null when the method has returned abruptly, i.e. by throwing an exception]

From the above note that both the entry and exit methods include an identification of the class that the invoking method 620 belongs to (classid) and an identification of the invoking method 620 itself (methodid). In an embodiment, the classid and methodid parameters are sufficient to identify the invoking method. In other embodiment, however, the classid, the methodid and a description of the invoking method's own arguments (which are referenced through an object identified by the "object [ ] param" argument) are used by the dispatch unit's entry method to identify the appropriate plug-in module treatment. As alluded to above with respect to FIGS. 5a and 5b and as described in more detail below with respect to FIG. 7, the dispatch unit 430 maintains information that correlates each method with the one or more plug-in modules that are supposed to treat it.

The entry method and exit methods may differ, however, in that the .entry method may also identify (e.g., via the "object this pointer" argument) the object associated with the invoking method (noting that if the invoking method is a class (i.e. static) method the "object this pointer" argument may be represented as a null); yet, the .exit method may make no such identification. As described above with respect to the embodiments of FIGS. 5a–b, a reference for an appropriate plug-in module may be returned to an invoking method in response to the invoking method's initial call of the dispatch unit's .entry method. In order to return the reference to the invoking method, the identity of the object to which the invoking method belongs should be known to the dispatch unit. Once the identity is known by the dispatch unit, it need not be repeated. Better said, the identity of the object to which the calling method belongs can be grasped by way of the .entry method; and, therefore, can be thereafter used by the dispatch unit for the subsequent .exit method.

The "object this pointer" parameter therefore does not need to be provided for .exit methods. The .entry method and exit methods may also differ in that the .entry method may describe the invoking method's own arguments as part of its invocation to the dispatch unit (i.e., in the case of the "GetMax" method, a and b as found in "object[param]"), whereas the .exit methods may only describe the returned output value as part of the invocation. This allows for different plug-in module treatment as between entry points and exit points of the same method. In one embodiment of the invention, if a method throws an exception, an .exit method event may be processed.

Referring back to the bytecode instruction level coding 620b, note that a third exit point and associated instruction level coding is also depicted 646b. According to the approach alluded to in FIG. 6a, the third exit point and associated instruction level coding 646b corresponds to an additional exit point that is added by the modification process 452 so as to effectively install a "catch block" around the entire method. A "catch block" is coding that automatically causes the software process flow to jump to a section of the coding designed to deal with errors (e.g., a location in the bytecode of a method) if an error occurs in the execution of the coding surrounded by the "try-catch" block (which, in the embodiment of FIG. 6a, corresponds to the entire GetMax method).

In summary, the modification process 452 implemented by bytecode modifier 352, besides installing blocks of instructions 643b, 644b, 645b for dispatching unit invocations at naturally existing method entry and exit points, may also be configured to install an artificial exit (i.e., one that would not exist were it not for the modification process) and associated instructions that are tailored to respond to an error condition, should one arise, during execution of the method. In such a case, the "i cmp" instruction (which is the instruction that signifies whether "a" is greater than "b" or if "b" is greater than "a") triggers an error condition; which, in turn, would cause instructions 646b to be executed.

Referring to both the bytecode level 620b and source code level 620a codings of the GetMax method, note that the error handling instructions 646b correspond to an invocation to the dispatch unit 430. Here, an .exit method is used to invoke the dispatch unit. Note that a "thrown" value (i.e., an error indication) is provided as part of the invocation. This allows a unique plug-in module to be utilized to in the case of an error condition. The error handling instructions 646b also include a generic thrown command that, when executed, raises an error state in the current thread, which can either be caught or propagated up the execution stack.

Figure 6B:
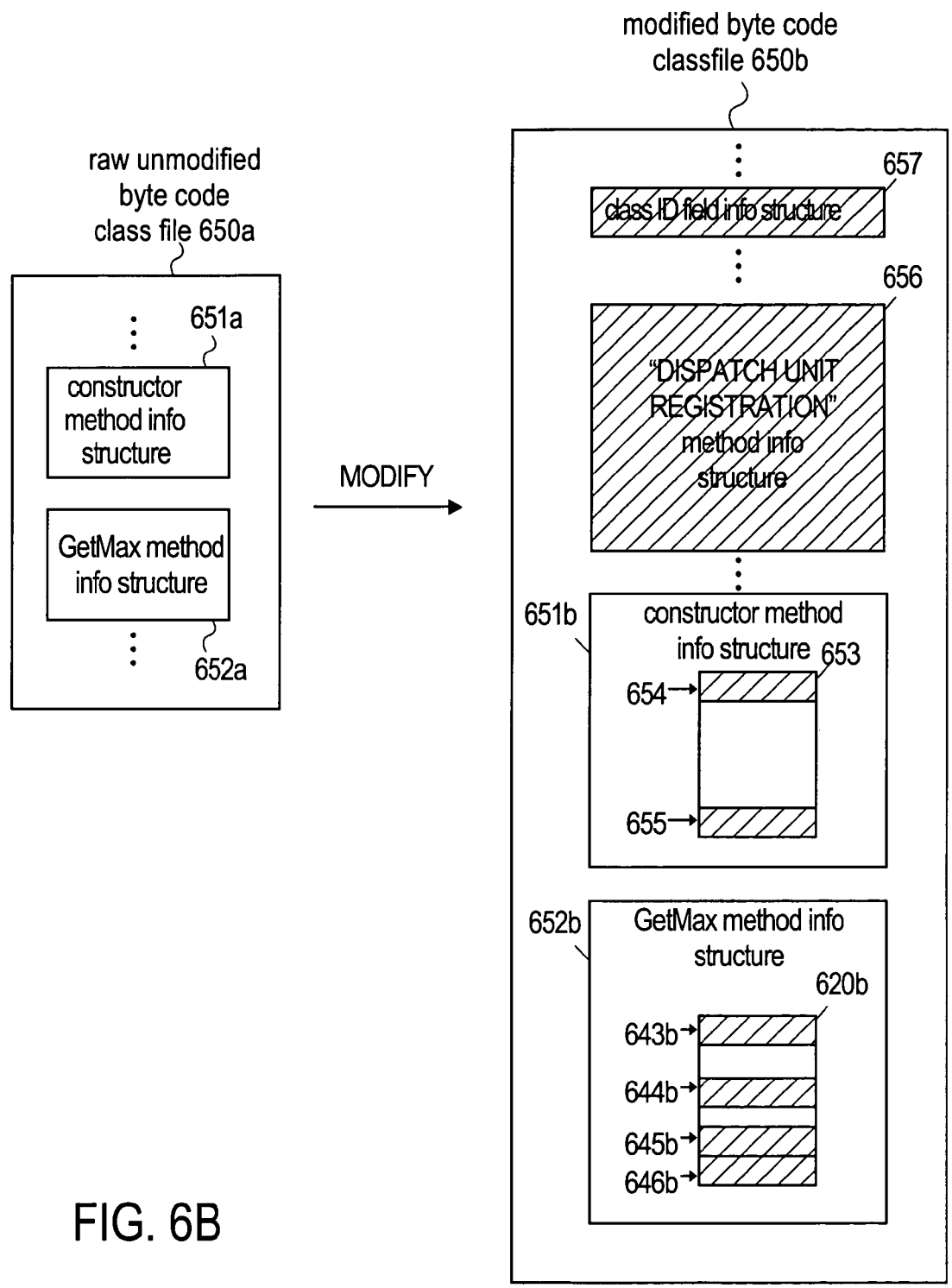
FIG. 6*b* shows an embodiment of a classfile that has been modified for debugging and/or monitoring purposes.

FIG. 6b provides an overview of other bytecode-level modifications that may be made by the modification process 452 of FIG. 4a. FIG. 6b shows a depiction of an unmodified classfile (e.g., a classfile produced by the compilation process 451 of FIG. 4a). Here, it may be worthwhile to recall the discussion of the classfile 103b provided in the Background with respect to FIG. 1b. From this discussion, it should be apparent that the raw classfile 650a may be made to include other features that have been obviated from FIG. 6b for illustrative convenience (e.g., field information structures, data information structures, other method information structures, . . . etc).

The unmodified classfile 650a in FIG. 6b shows both an unmodified constructor method information structure 651a and a depiction of the unmodified information structure for the "GetMax" method 652a. A constructor method is a method which is always executed with the creation of an object. In a typical application, a constructor method is executed in order to initialize the other method (such as setting variables to specific values). The constructor method 651a associated with unmodified classfile may be viewed as being necessary to execute before the execution of the GetMax method or another method found within classfile 650a.

The exemplary bytecode modified classfiile 650b includes the following elements: (1) a "classid" field information structure 657; (2) a method information structure 656 for a method that registers with the dispatch unit when the modified classfile 650b is loaded during runtime execution; (3) a method information structure 651b for a modified version 653 of the constructor method; and (4) a method information structure 652b for the modified version of the GetMax method 620b that was discussed above with respect to FIG. 6a. A discussion of each follows immediately below.

The additional classid field information structure 657 and the additional method information structure 656 (for the dispatch unit registration method) will be discussed together. Specifically, in an embodiment, when the modified classfile 650b is loaded it automatically registers with the dispatch unit. In a further embodiment, the registration process entails providing the dispatch unit with the name of the class that the classfile 650b represents, the name of its methods and the number and type of each method's arguments. In return, the dispatch unit provides the classfile with a numeric "classid" value that is to be used for invocations made to the dispatch unit during a runtime invocation. The classid value then becomes part of the classfile's constant pool. Accordingly, the additional method information structure 656 may include instructions for the registration method described just above; and, the classid information structure is used for the returned numeric "classid" parameter provided by the dispatch unit.

Viewing the constructor method prior to modification as a simple "straight through" method having a single entry point and a single exit point, FIG. 6b indicates that the instructions 653 for the method may be modified so as to include a block of instructions 654 at its entry to invoke the dispatch unit; and, a block of instructions 655 at its exit to invoke the dispatch unit. Here, the handler(s) of the appropriate plug-in module(s) (that are called upon as a consequence of invocations made to the dispatch unit from additional instruction blocks 654, 655) may be tailored to report the initialized values for a method as determined by the constructor method. The exit block of instructions 655 may also be followed by another block of instructions that correspond to the placement of a try-catch block around the constructor method. The modified version of the GetMax method 620b has already been discussed with respect to FIG. 6a.

4.0. Dispatch Unit, Plug-In Modules and Handlers

Recall from the background that, in general, the runtime execution of any computer program can be viewed as the execution of a sequence of methods; and that, with respect to an object oriented approach, such a sequence of methods can be implemented by calling upon a sequence of objects and invoking one or more methods at each object. Referring back to FIGS. 3 and 4b, implementing the bytecode modification approach in an object-oriented environment may take on many forms.

In one embodiment, the dispatch unit 330, 430 is implemented as a class whose entry and exit methods are static methods of the dispatch unit class. In this same embodiment, each of the plug-in modules $331_1$ through $331_N$, $431_1$ through $431_N$ are instantiated as separate objects from a "plug-in" class; and, the individual handlers of each plug-in module object correspond to its operable methods.

4.1. Dispatch Unit Implementation

The dispatch unit 430 may be implemented to refer to, as illustrated in FIG. 7, a dictionary, table or similar data structure 701 (hereinafter "dictionary") to support the dispatch unit in its central role of dispatching invocations made by each of the modified bytecode methods to its appropriate one or more plug-in modules. The dictionary 701 of FIG. 7 includes a listing of information sufficient to uniquely identity any potential invoking or calling method (methodid and classid); and, an entry for each listing that includes a reference to the appropriate plug-in module(s). Different dictionary's may be maintained for .entry and exit methods. In further embodiments (e.g., as suggested by the source code representations of FIG. 6a), the information that is sufficient to identify an invoking method may be made to further include arguments of the invoking method (e.g. via the "object[param]" for the entry method).

In response to the reception of the information, a method responsible for accessing the dictionary (e.g., a .entry or a .exit method) identifies the reference(s) that is listed for the invoking method; and, returns the reference(s) to the invoking method. Thus, from the perspective of an invoking method, an invocation is made to the dispatch unit 330, 430; which, in response, returns to the invoking method the reference to the appropriate plug-in module $331_1$–$331_N$, $431_1$–$431_N$. The process flow then jumps to the plug-in module(s), causing the corresponding handler instructions to be executed.

FIG. 7 shows an embodiment of a dictionary 701 that can be viewed as being applicable at least to the four bytecode modified methods 405, 406, 407, 408 of FIG. 4b; where, methods 405, 406 belong to the same class (class "1"), method 407 belong to a second class (class "2") and method 408 belongs to a third class (class "3"). The dictionary lists the appropriate plug-in module for each bytecode modified method. According to the depiction of FIG. 7, PIM_A and PIM_B represent the references to plug-in modules A 460 and B 470. Note that, in the embodiment of FIG. 7, each bytecode modified method is identified by its classid and methodid parameter set ($c_x.m_y$). Again, in further embodiments, arguments of the invoking method could be included.

It is also worthwhile to point out that more than one plug-in module may be used for any single invocation from a modified method. For example, referring briefly back to FIG. 4b, consider a situation where the same treatment is desired for each of methods 405 through 408 as originally discussed (i.e., methods 405 and 408 are to receive only tracing treatment and method 407 is to receive both tracing treatment and coverage treatment), however, plug-in module 470 is configured so as to only include the coverage handler 463 (i.e., tracing handler 462 simply does not exist in plug-in module 470).

In this case, method 407 could still receive both tracing and coverage treatment by configuring the dictionary entry for method 407 to list both plug-in module A 460 (PIM_A) and plug-in module B 470 (PIM_B). By so doing, the process flow of FIG. 4b would change so as to touch upon both of plug-in modules A and B 460, 470 for each of the invocations stemming from bytecode modifications 411 and 420. Here, if the approach of FIGS. 5a and 5b were being implemented, the dispatch unit 430 would return references to both of the plug-in modules 460, 470 to method 407 for each invocation to the dispatch unit.

4.2. Extensions of Plugins and GUI Viewers

Figure 8:
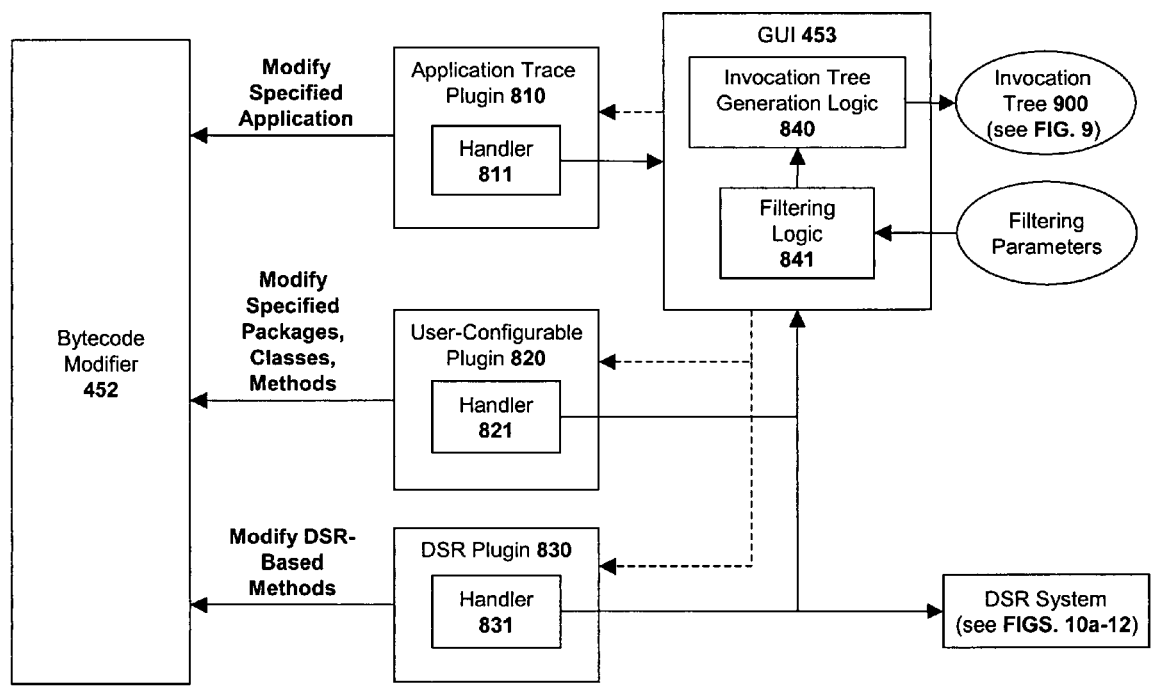
FIG. 8 illustrates an exemplary set of bytecode modification plugins employed in one embodiment of the invention.

As mentioned above with respect to FIG. 4a, unique plugins may be developed based on the specific needs of each user. By way of example, FIG. 8 illustrates an embodiment in which three different plugins are used: an application trace plugin 810; a user-configurable plugin 820; and a distributed statistical records ("DSR") plugin 830.

The application trace plugin 810 of this embodiment identifies a particular application to the bytecode modifier 452 (e.g., in response to user input). In response, the bytecode modifier 452 modifies the entire application, by inserting function calls at entry points and exit points of each of the application's methods (e.g., using the bytecode modification techniques described herein).

Following modification, the application is executed, and the application trace handler 811 collects the timing data and, potentially, other method-related information, which it provides to a graphical user interface ("GUI") 453. In one embodiment, tree generation logic 840 within the GUI 453 generates a method invocation tree 900 such as that illustrated in FIG. 9a, (which shows a method invocation tree 900 for a simple calculator application.

The invocation tree 900 graphically displays information related to each invoked method, such as the time that it takes each method to complete and/or parameters used for each method, in a structured hierarchy. For the calculator application, three separate headings 901, 910, and 920 are generated, each of which identify a different thread of the calculator application (e.g., "SAPEngine_Application_Thread_5"). Entries for methods associated with each application thread are arranged beneath each respective thread heading. For example, method entry 902 is arranged directly beneath heading 901; method entries 911 are arranged directly beneath heading 910; and method entry 921 is arranged beneath heading 920.

Method entries 902, 911 and 921 represent "independent" methods in that they are not tied to the execution of another method (i.e., they are not invoked within the context of another method). By contrast, several "dependent" method entries 903–905, i.e., representing methods that are dependent on the method represented by entry 902, are graphically arranged under entry 902 within the invocation tree 900. For example, method entry 903 is dependent on method entry 902; method entry 904 is dependent on method entry 903; and method entries 905 are each dependent on method entry 904. As is known in the art, a first method is "dependent" on a second method if the first method is executed within the context of the second method. For example, the method represented by entry 903 is only executed within the method represented by entry 902. Thus, as indicated by dependency arrow 931, the dependency of methods increases as one moves towards the right within the invocation tree (i.e., methods towards the right are dependent on entries which are relatively further to the left).

In addition, as indicated by the time arrow 930 in FIG. 9a, in one embodiment, the tree generation logic 840 generates the invocation tree 900 so that entries towards the bottom of the invocation tree occur relatively later in time in relation to entries towards the top of the invocation tree. This graphical representation of method invocations based on time and dependency is a logical and useful way to display information related to method invocations.

As mentioned above, various different types of information may be displayed for each entry within the invocation tree 900. In the example shown in FIG. 9a, each entry includes an indication of how long the method took to complete (i.e., based on the measured start/stop times). For example, an indication that method "CalcProxy.GetResults( )" took 44,651 µs to complete is provided in method entry 903. In addition, an indication of certain input/output parameters used in the method may also be provided (e.g., "3," "423," "1" for method entry 903). Various other types of method-related information may be included within the invocation tree 900 while still complying with the underlying principles of the invention (e.g., the counter value for the method).

In one embodiment, a filtering module 841 is employed to filter timing data and other method-related information, based on the needs of the end user. For example, a user may choose to filter all method invocations from the method invocation tree 900 except for those methods associated with a particular application component, package or class. Similarly, in one embodiment, the filtering parameters may be applied so that only specific types of method-related information are displayed within the invocation tree 900. For example, the filtering parameters may specify that only each method's timing information is to be displayed whereas other information (e.g., the method's input/output variables, the counter value, . . . . etc), is to be filtered out. Thus, the filtering module 841 provides a more precise level of control over the types of method's and the types of method-related information to be displayed within the graphical user interface 453.

An exemplary graphical user interface ("GUI") for viewing information related to modified bytecode is illustrated in FIGS. 9b–e. For the purpose of explanation, the GUI displays different aspects of the modified calculator application described above with respect to FIG. 9a. The exemplary GUI includes a first window 941 comprised of a list of services which may be selected by the end user. As indicated, the application tracing service 942 has been selected, thereby generating information related to application tracing in a second window 946.

Different information related to the bytecode modification may be displayed in the second window via a set of tabs 944. In FIG. 9b, for example, an "Applications" tab is selected, thereby displaying a list of applications. For each application, an indication is provided identifying whether the application is started or stopped and, if started, whether the application is running in bytecode modified mode. The highlighted entry 943 indicates that the calculator application is currently running in bytecode modified mode. In addition, an action menu 945 is illustrated which includes entries for stopping the highlighted application 943 or restarting the application normally (i.e., in a non-modified mode). In one embodiment, the action menu 945 includes an option for restarting the application in bytecode modified mode (not shown) if the highlighted application is currently running in a non-modified mode.

Figure 9A:
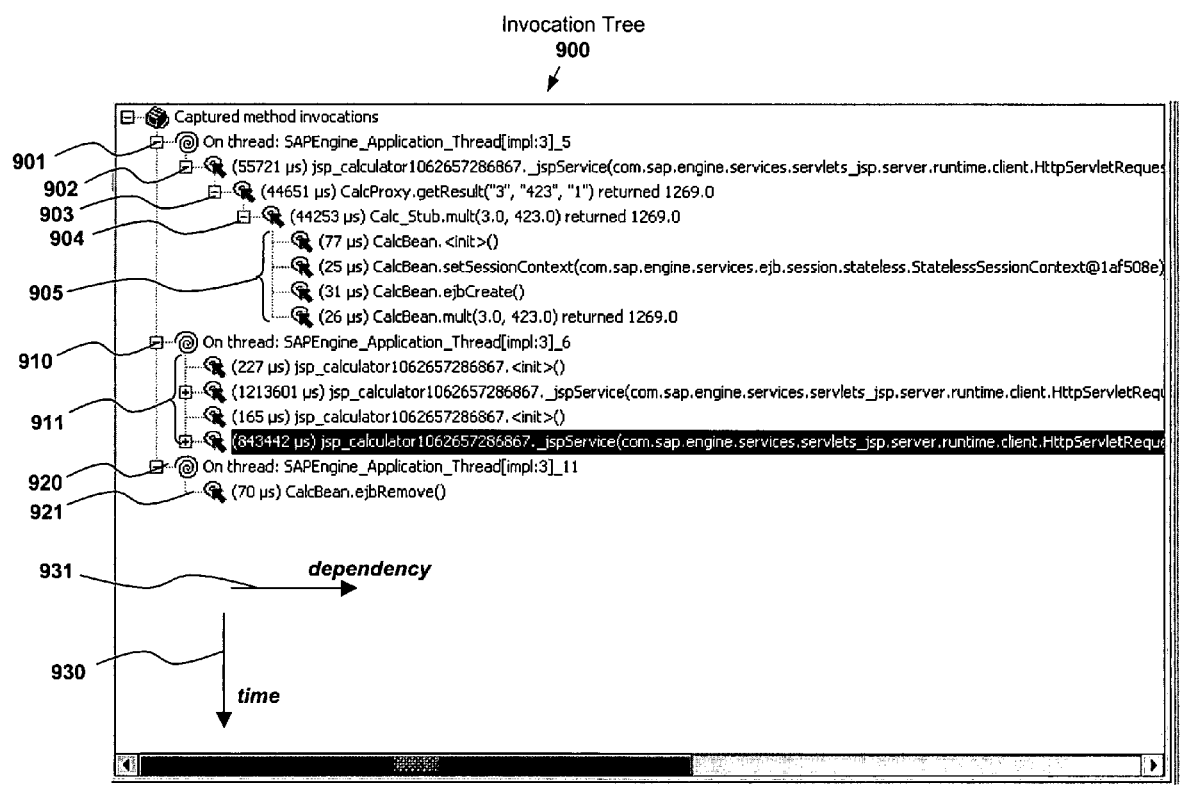
FIG. 9*a* illustrates an invocation tree for displaying bytecode modified method invocations employed in one embodiment of the invention.
Figure 9B:
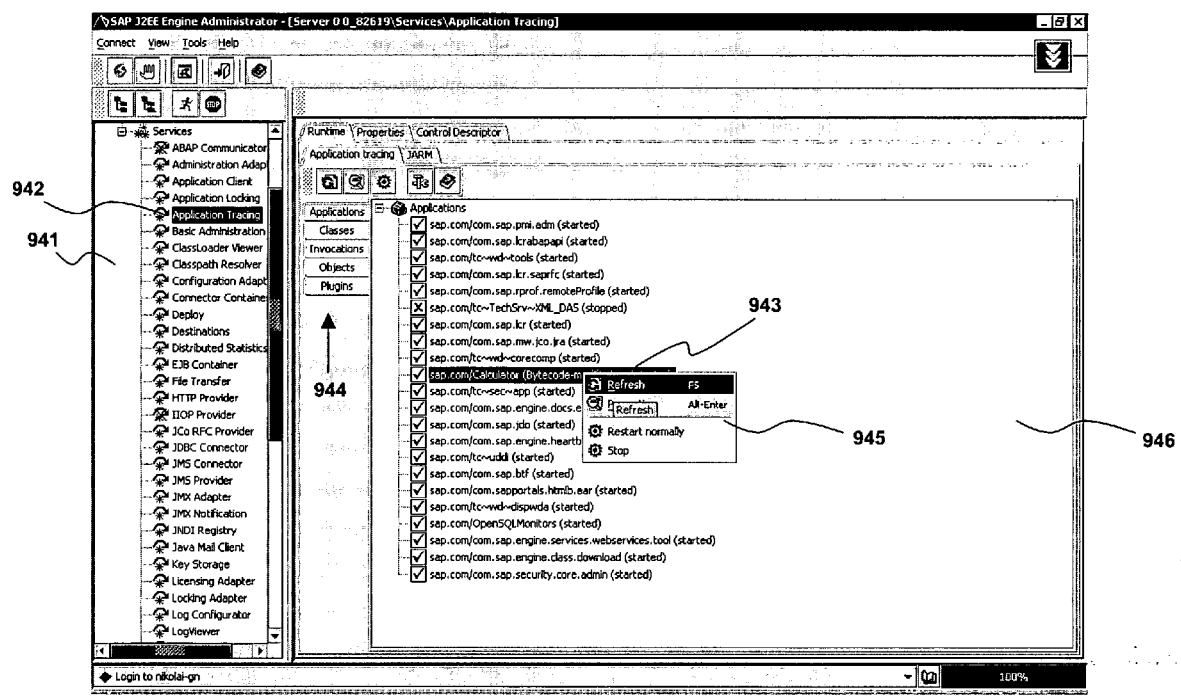
FIG. 9*b–e* illustrate one embodiment of a graphical user interface for viewing information related to modified bytecode.
Figure 9C:
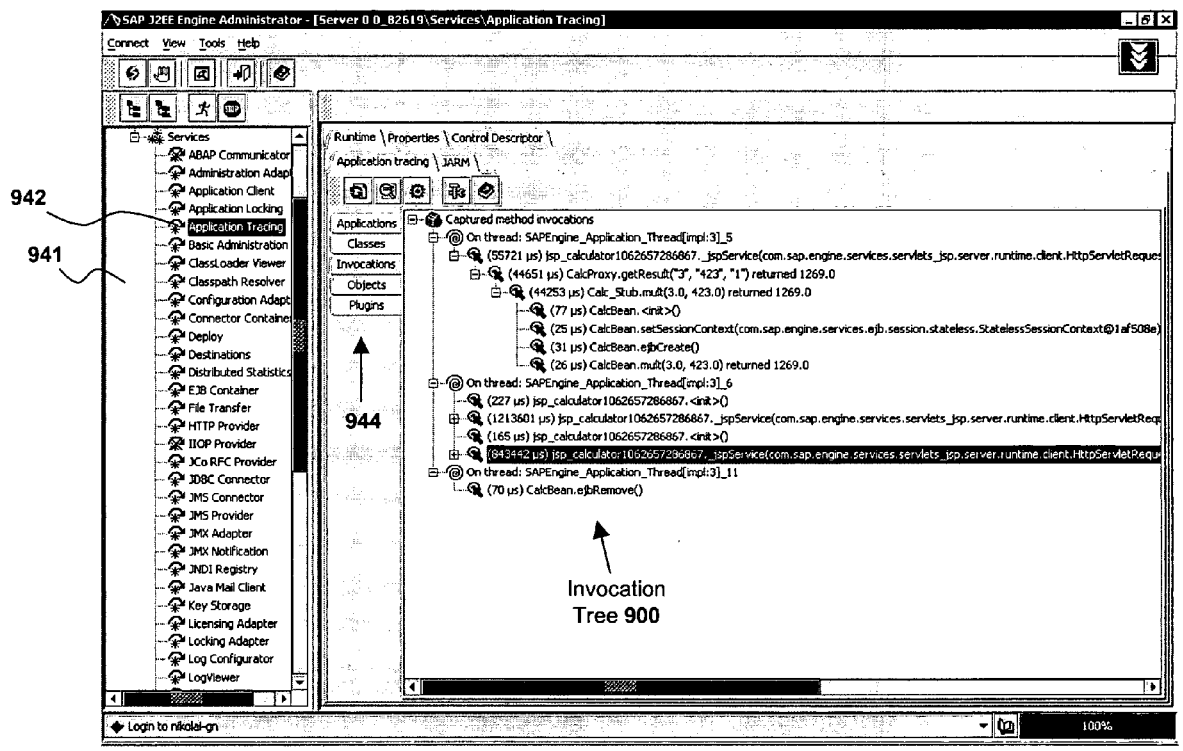
Figure 9D:
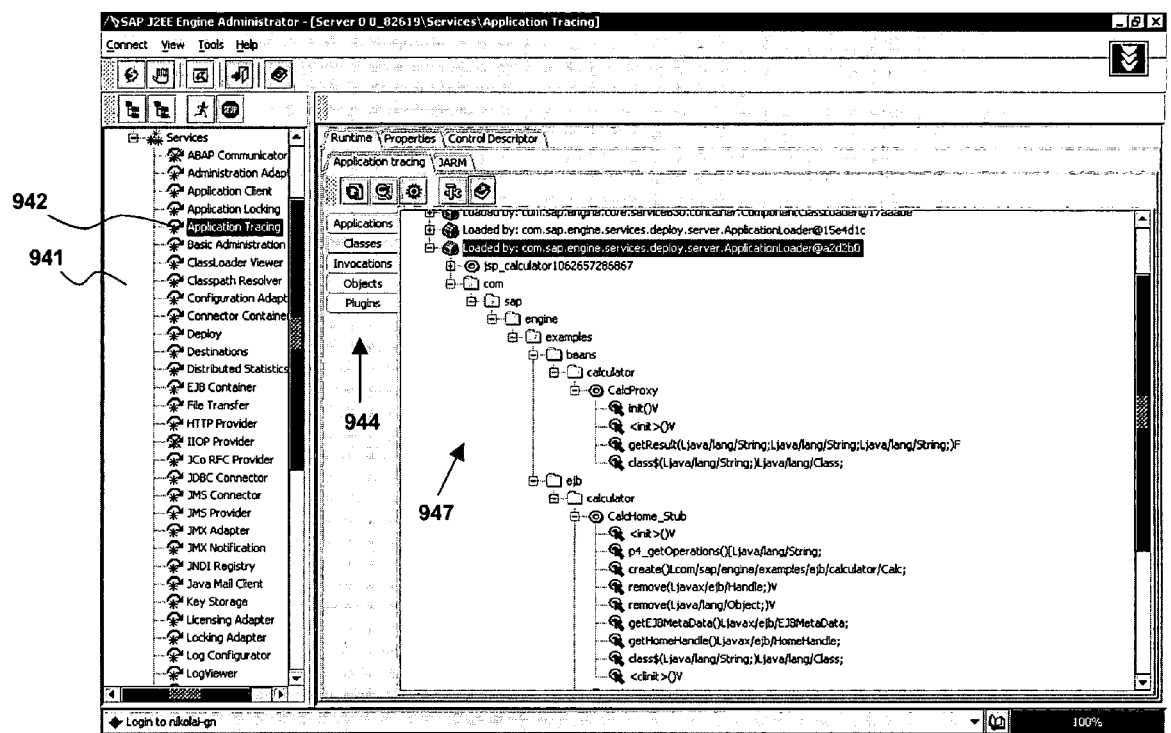
Figure 9E:
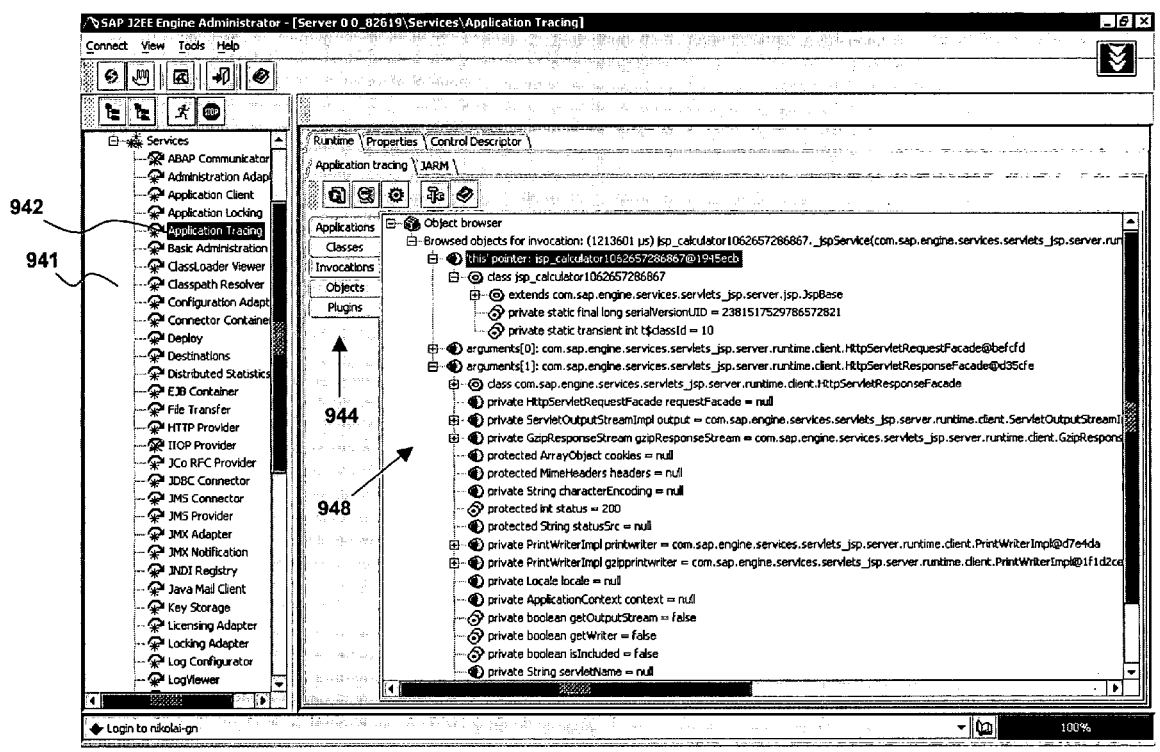

FIG. 9c illustrates the invocation tree 900 (initially illustrated in FIG. 9a) within the context of the exemplary GUI. The invocation tree is shown within the second window 946 in response to user selection of an "Invocations" tab from the set of tabs 944. FIG. 9d illustrates information related to the different classes affected by the bytecode modification of the calculator application, arranged in a logical hierarchy 947 in response to user selection of the "Classes" tab from the set of tabs 94 944. Finally, FIG. 9e provides an object view 948 of the modified calculator application in response to user selection of an "Objects" tab from the set of tabs 944.

It should be noted that the specific GUI-based features described above are for the purpose of illustration only. Information related to bytecode modification may be displayed in a variety of additional and/or different ways while still complying with the underlying principles of the invention.

As described above, the application tracing plugin 810 instructs the bytecode modifier to modify all of an application's methods. While this may be sufficient for tracing/debugging a relatively small application, a higher level of precision may be desirable, particularly when working with large enterprise applications.

Thus, in contrast to the application tracing plugin 810 which causes the bytecode modifier 452 to modify all of the methods within a particular application, the user-configurable plugin 820 illustrated in FIG. 8 provides a finer level of granularity for tracing program flow. An "application" may be built from a plurality of packages (typically *.jar files in a Java environment); each package may be built from a plurality of classes (i.e., class files); and each class include a plurality of methods. As indicated in FIG. 8, the user-configurable plugin 810 allows the end-user to identify specific packages, classes and/or individual methods to be modified by the bytecode modifier 452, thereby providing significantly greater precision for tracing and debugging operations. By way of example, if a coding problem is isolated to within a specific package, then only that package need be modified. Similarly, if the problem can be isolated to within a particular class or method, then only that class/method need be modified. In one embodiment, the different packages, classes and/or methods are selected and modified via one of the interfaces described below with respect to FIGS. 19a–e.

The method timing data and/or other method-related information may then be displayed within a method invocation tree 900 similar to that illustrated in FIG. 9a. For example, an output handler 821 associated with the user-configurable plugin 820 may be designed to provide the method-related information to the invocation tree generation logic 840. Thus, when the user-configurable plugin 820 is employed (as opposed to the application tracing plugin 810), the method invocation tree does not include entries for all of the methods of an application. Rather, it only includes entries for methods within the particular package or class, or the individual methods selected by the end-user.

In addition, in one embodiment of the invention, a distributed statistical records ("DSR") plugin 830 is employed to collect statistical data related to program execution across application servers, databases and/or external systems. Several specific examples of DSR tracing will now be described with respect to FIGS. 10a-12, which shows how certain critical entry/exit methods may be tracked to collect statistical data.

Figure 10A:
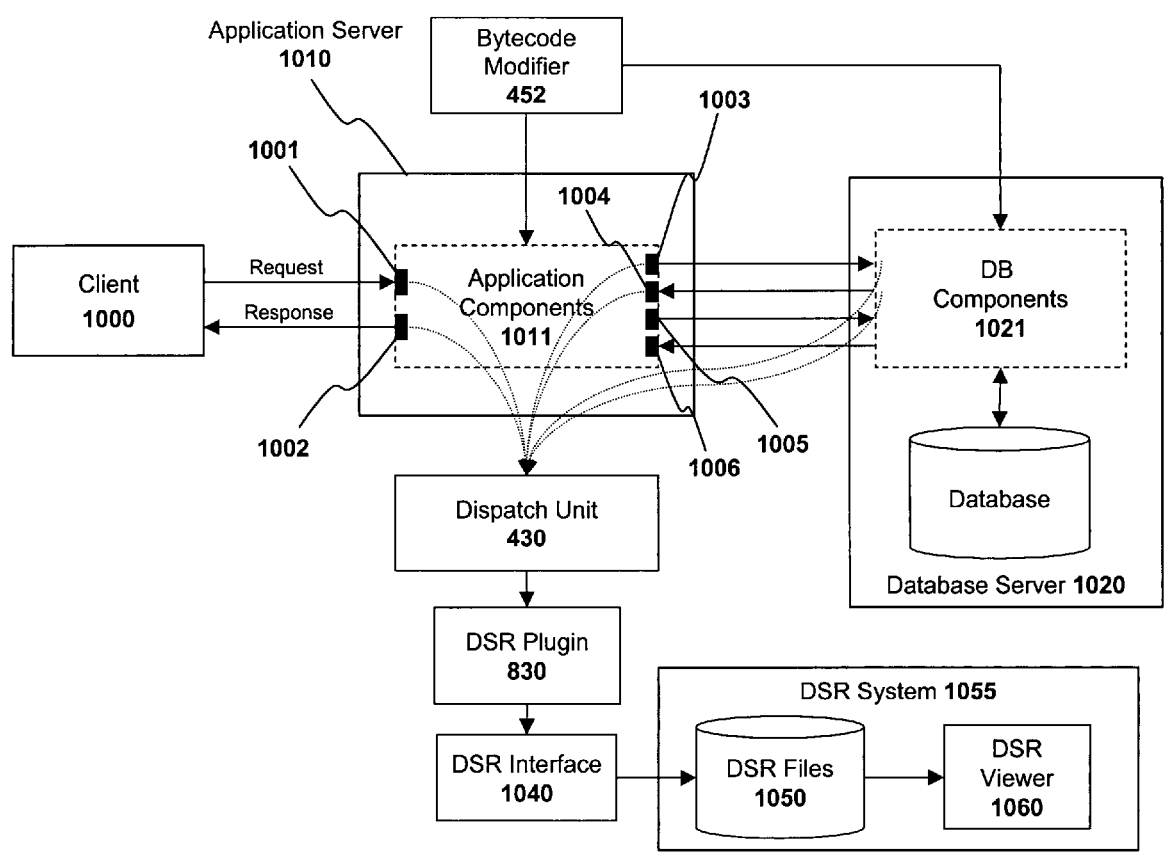
FIGS. 10*a–b* illustrate one embodiment of the invention used to implement a distributed statistical records ("DSR") service.

FIG. 10a shows an exemplary system comprised of an application server 1010 and a database server 1020. Application components 1011 executed on the application server 1010 may include, by way of example, presentation logic and business logic components. Within a J2EE environment, the presentation logic may contain servlets and Java Server Pages ("JSP") interpretable by browsers on clients 1000 (JSPs/Servlets generate HTML which is interpreted by browsers), and the business logic may include Enterprise Java Bean ("EJB") components which are supported by EJB containers. However, as previously mentioned, the underlying principles of the invention are not limited to a Java implementation.

In the specific example shown in FIG. 10*a*, certain specific method invocations, identified graphically as blocks 1001–1006, within the application components 1011 are modified to facilitate tracking of client requests and responses through the system. The timing for each of the relevant method invocations is identified in the timing diagram illustrated in FIG. 10*b*.

The client's 1000's initial request triggers a first method invocation 1001 within the application components 1011. The request may be, for example, a request for a particular record within the database. After additional application-layer processing, the application components 1011 generate a database request via method invocation 1003 which is received and processed by the database components 1021. A single request/response transaction with a client may involve multiple method-based interactions between the application server 1010 and the database server 1020. Thus, another method 1004 is invoked in response to a communication from the database server 1020; a response to the database server is generated as method invocation 1005 and a final response from the database server 1020 is received as method invocation 1006. Finally, the application responds to the client via method invocation 1002 (e.g., which may provide a Web page containing the requested data to the client).

As indicated in FIG. 10*a*, throughout the request/response transaction, each of the bytecode modified methods 1001–1006 reports statistical timing data and other method-related information back to the dispatch unit 430, which forwards the information to the DSR plugin 830. One or more DSR handlers 831 associated with the DSR plugin 830 formats the information for the DSR system 1055 and/or provides the information to the DSR system 1055 via a DSR interface 1040. In one embodiment, the DSR interface 1040 translates the method-related information into a format usable by the DSR system. The information may be stored within a set of DSR files 1050 and/or viewed and analyzed via a DSR viewer 1060 (e.g., to determine whether the system is operating correctly).

The method-related information may also be provided to the GUI 453 which then generates an appropriate method invocation tree, and/or displays the method-related information in one or more additional ways (as described above). Although not illustrated in FIG. 8, a different DSR handler may be employed to format and forward the DSR-based information to the GUI 453.

Figure 10B:
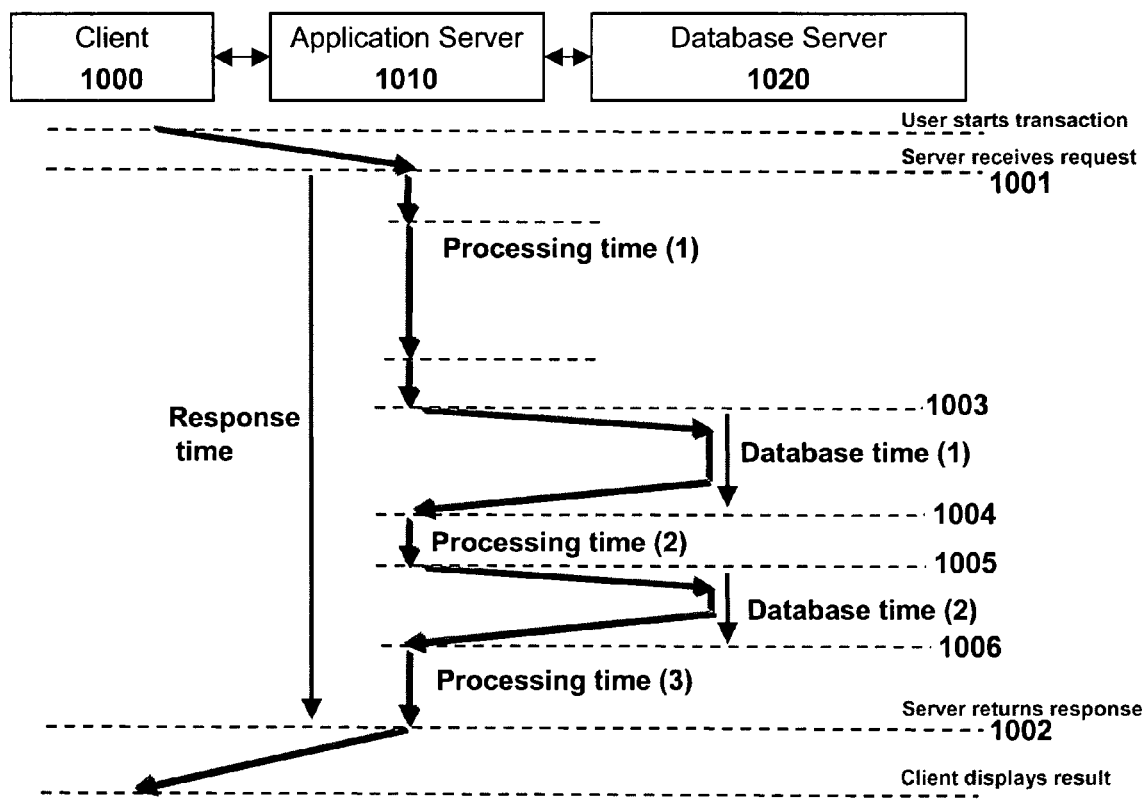
Figure 11A:
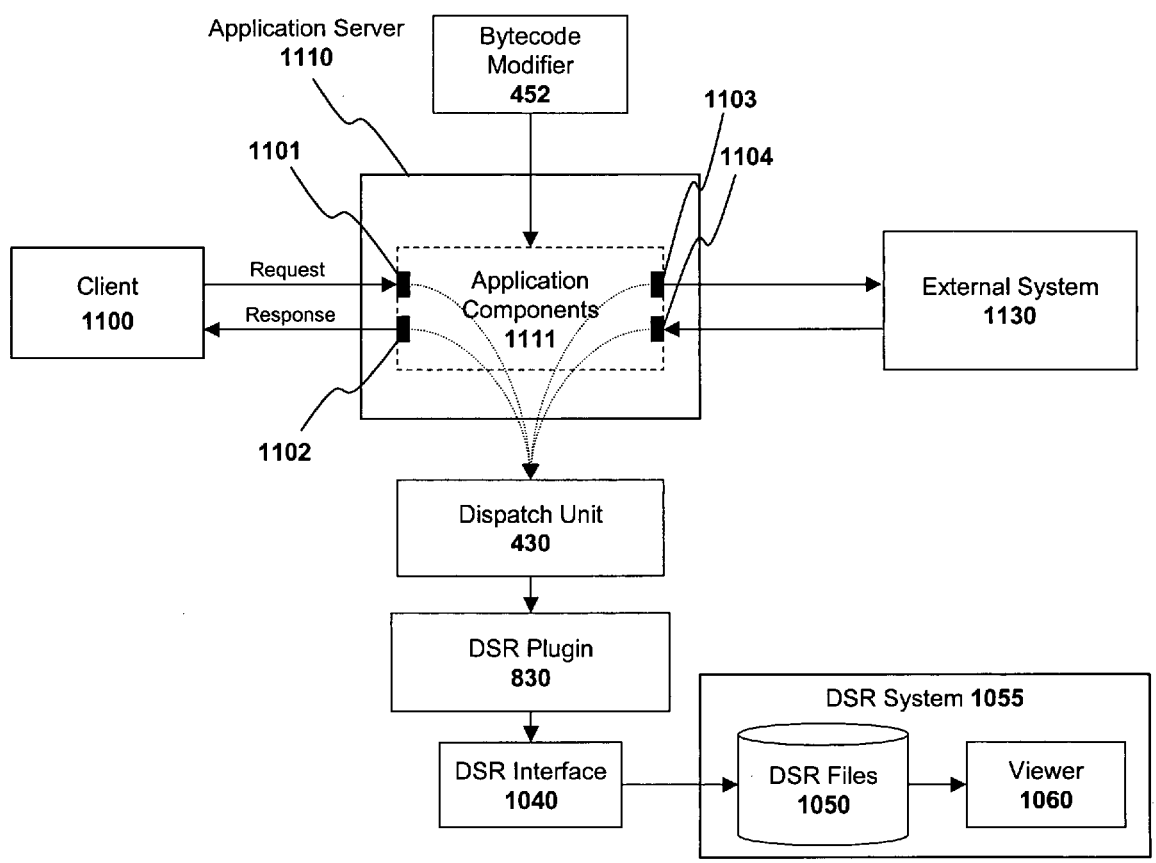
FIGS. 11*a–b* illustrate another embodiment of the invention used to implement a distributed statistical records ("DSR") service.
Figure 11B:
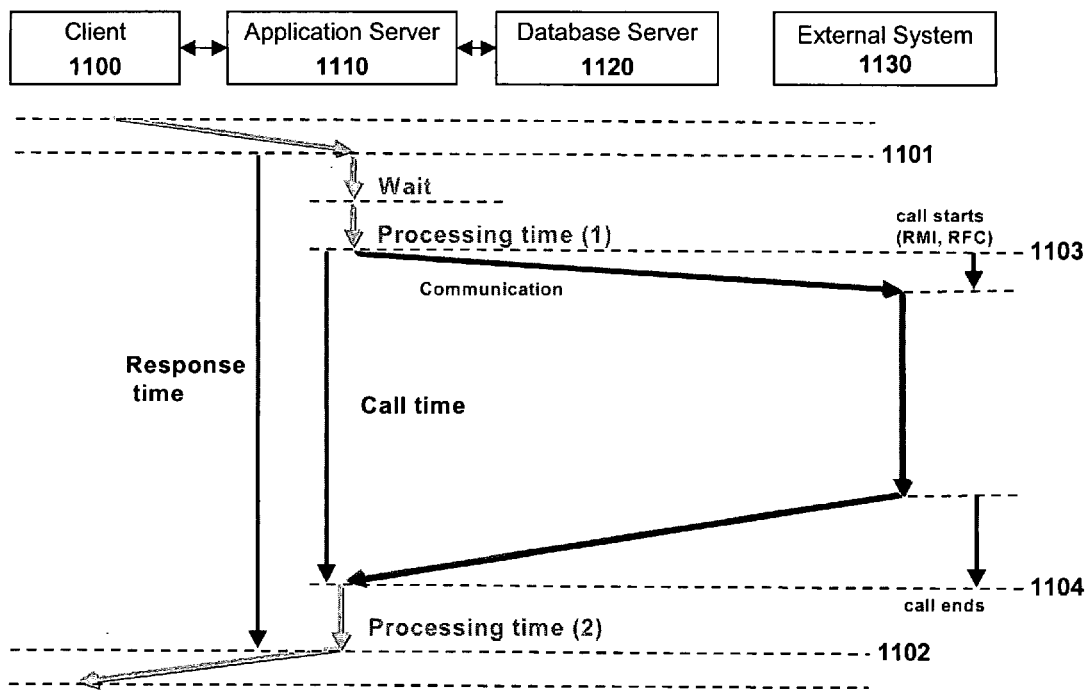

FIGS. 11*a*–*b* illustrate another embodiment of the invention in which distributed statistical information is collected using the bytecode modification techniques described herein. In FIG. 11*a*–*b*, the application components 1111 within the application server 1110 communicate with and/or exchange data with an external system 1130 (e.g., such as an R3 system designed by SAP AG) as opposed to a database server as in FIGS. 10*a*–*b*. However, similar principles apply. In this embodiment, For example, the client's 1100's initial request triggers a first method invocation 1101 within the application components 1111. The request may be, for example, a request for a particular record within the database. After additional application-layer processing, the application components 1111 generate an external request via method invocation 1103 which is received and processed by the external system 1130. The specific format used for the external request may be based on the type of communication protocol supported by the external system 1130. Possible communication formats include (but are not limited to) remote method invocations ("RMI") or remote function calls ("RFC"). RMI is a type of remote procedure call which allows distributed objects written in Java (e.g., Java services/components) to be run remotely. RFC is a communications interface which allows external applications to communicate with R/3 systems. It should be noted, however, that the underlying principles of the invention are not limited to any particular communications protocol for communicating with an external system 1130.

The external system 1130 then processes the request and provides the results back to the application components via method invocation 1104. Finally, the application components respond to the client 1100 via method invocation 1102.

As in the examples shown in FIGS. 10*a*–*b*, each time a bytecode-modified method is invoked, timing data and other method-related information is provided to the dispatch unit 430, which forwards the method-related information to the DSR plugin 830. The appropriate handlers (e.g., handler 831) then format and/or forward the method-related information to the DSR system 1055 via the DSR interface 1040. The DSR interface 1040 may translate the information into a format interpretable by the DSR system, if necessary. The information may then be stored within a set of DSR files 1050 and/or viewed and analyzed via a DSR viewer 1060. In addition, as in the embodiment shown in FIG. 10*a*, the method related information may also be sent to the GUI 453 for viewing within an invocation tree and/or may be displayed in any other convenient manner.

Figure 12:
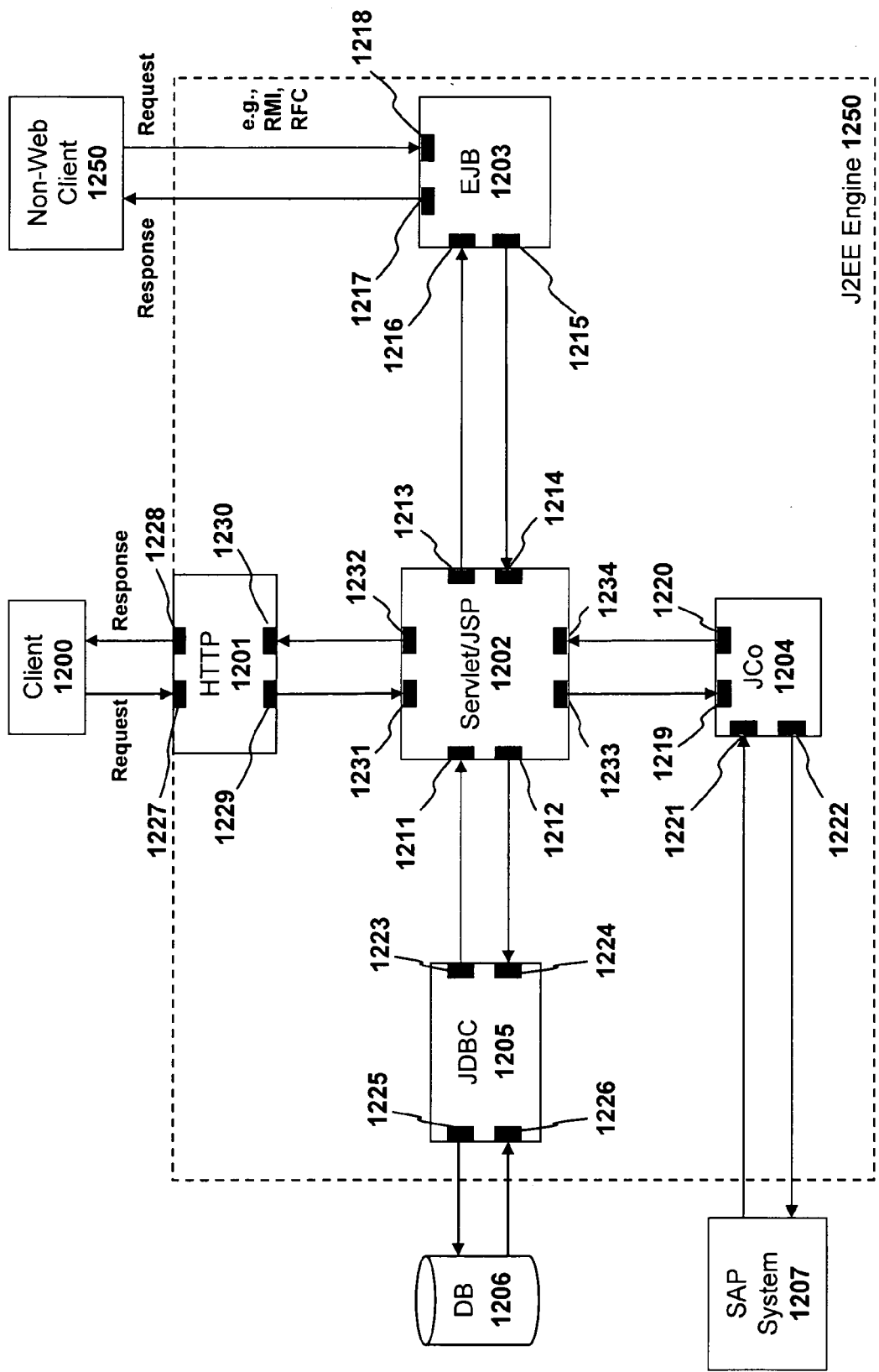
FIG. 12 illustrates one embodiment of the invention for collecting method invocation data related to a specific components of a Web server.

FIG. 12 illustrates one embodiment of the invention in which the bytecode modifier 452 modifies a particular set of methods 1211–1232 to trace program flow within a J2EE engine 1250. For example, HTTP requests transmitted by a Web-based client 1200 (e.g., a client with a Web browser) are processed by input/output method invocations 1227–1228 of HTTP logic 1201. Communication between HTTP logic 1201 and servlet/JSP components 1202 is accomplished via method invocations 1229, 1230 and 1231, 1232, respectively. Other method invocations illustrated in FIG. 12 which represent entry/exit points between different J2EE services include method invocations 1213, 1214, 1216 and 1215 between enterprise Java bean ("EJB") components 1203 and servlet/JSP components 1202; method invocations 1233, 1234 and 1219, 1220 between servlet/JSP components 1202 and Java connector ("JCo") components 1204; method invocations 1221 and 1222 between JCo components 1204 and an external system 1207; method invocations 1211, 1212 and 1223, 1224 between servlet/JSP components 1202 and Java database connectivity ("JDBC") components 1205; and method invocations 1225, and 1226 between the JDBC components and a database 1206; and method invocations 1217 and 1218 between EJB components and a non-web client 1250 (e.g., via RMI or RFC transactions).

The specific functions performed by each of the modules/components illustrated in FIG. 12 are well defined and are not necessary for an understanding of the underlying principles of the present invention. For example, the JDBC component 1205 is a well known interface that allows Java applications to access a database via the structured query language ("SQL"). The JCo component 1204 is an interface that allows a Java application to communicate with systems designed by SAP AG (e.g., an R/3 system). As described above, HTTP logic 1201 and servlet/JSP components 1202 perform various well defined presentation-layer functions and the EJB components 1203 perform various well define business layer functions. Further details related to each of these modules/components can be found from various sources including the Java website (see, e.g., the website located at java.sun.com).

For the purpose of the present application, FIG. 12 is significant because it shows how specific entry/exit points between the various services/components 1201–1205 may be tracked using the bytecode modification techniques described herein. For example, the individual methods highlighted in FIG. 12 may be selected for modification via a plugin such as the user-configurable plugin 820 illustrated in FIG. 8. As the methods are executed, timing data and other information related to each of the methods (e.g., method parameters) are collected by the dispatch unit 430 and forwarded to the appropriate plugin handlers (e.g., handler 821). The handler(s) then forward the information to a GUI 453 or other output destinations for analysis. If a DSR plugin 830 is used, the dispatch unit 430 may forward the method information to an appropriate the DSR handler 831 which, in turn, may format and/or transmit the information to a specified DSR system via a DSR interface (e.g., such as DSR system 1055, and DSR interface 1040, respectively).

Figure 13:
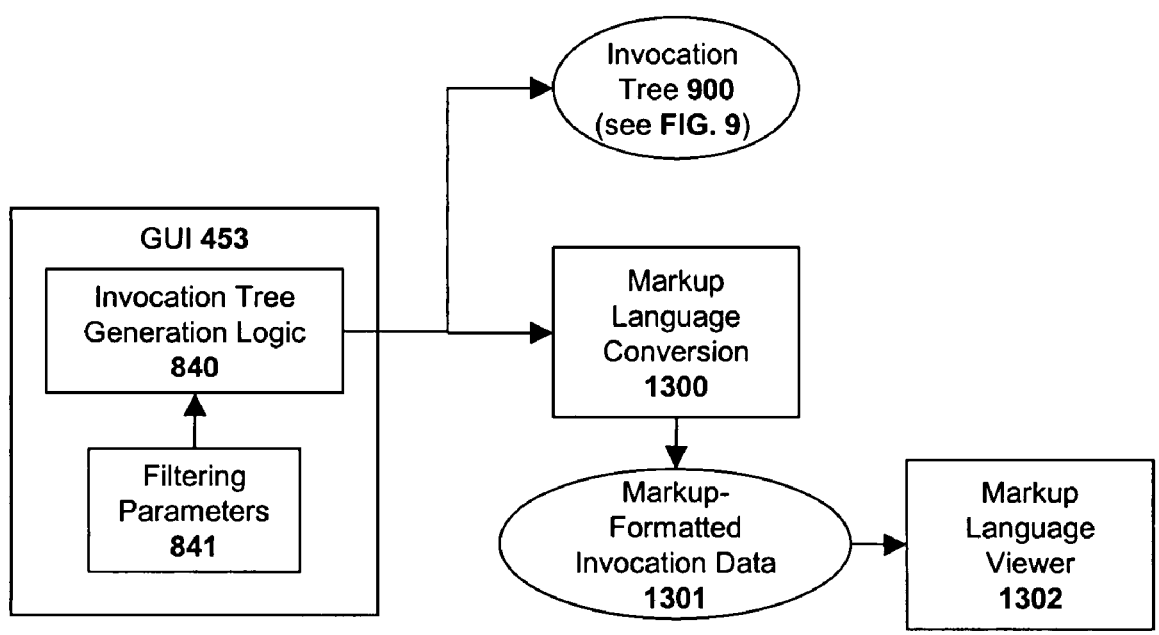
FIG. 13 illustrates a markup language converter for converting a method invocation tree into a markup language format (e.g., such as XML or HTML).

Some end users may want to export the results of the bytecode modification techniques described herein to a standardized format, so that the results may be viewed and/or analyzed on other systems. To this end, as illustrated in FIG. 13, one embodiment of the invention includes a markup language conversion module 1300 for converting the method invocation tree generated by the tree generation logic 840 into a markup language format 1301. For example, in one embodiment, the markup language conversion module 1300 converts the method timing data and other method-related information from the invocation tree into an extensible markup language ("XML") format. XML provides a similar tag structure as the hypertext markup language ("HTML") used for standard Web pages; however, while HTML defines how elements are displayed, XML defines what those elements contain. In addition, while HTML uses predefined tags, XML allows tags to be defined by the developer of the page. Thus, all method-related data from the invocation tree (e.g., method execution times, method parameters, counter values, . . . etc) may be easily represented within an XML file using a set of hierarchical data tags. The markup-formatted invocation data may then be viewed, edited and/or analyzed via a GUI which supports the specified markup language (e.g., current browsers, if the markup language used is XML).

Instead of converting the invocation tree generated by the tree generation logic 840 into a markup language format, one embodiment of the markup language conversion module 1300 receives the method-related data directly from the a handler 811, 821, 831. This embodiment may be more efficient in that it circumvents the intermediate tree generation by the invocation tree generation logic 840.

5.0. Implementing Bytecode Modification

The discussions presented above focus upon characteristics of modified bytecode and the runtime execution flow of modified bytecode. The present section, by contrast, focuses on techniques for actually modifying the bytecode. Better said, referring back to FIG. 4a, whereas prior sections focused upon what the "output" of the bytecode modification process 452 might look like and how modified bytecode might execute 453 during runtime, the present section focuses on methodologies that may be used to implement the actual bytecode modification process 452. Specifically, Section 5.1 discusses techniques for modifying classfiles; Section 5.2 discusses dispatch unit configuration; and, Section 5.3 discusses interfaces for specifying customized plug-in modules.

5.1 Processes for Modifying Classfiles

Figure 14:
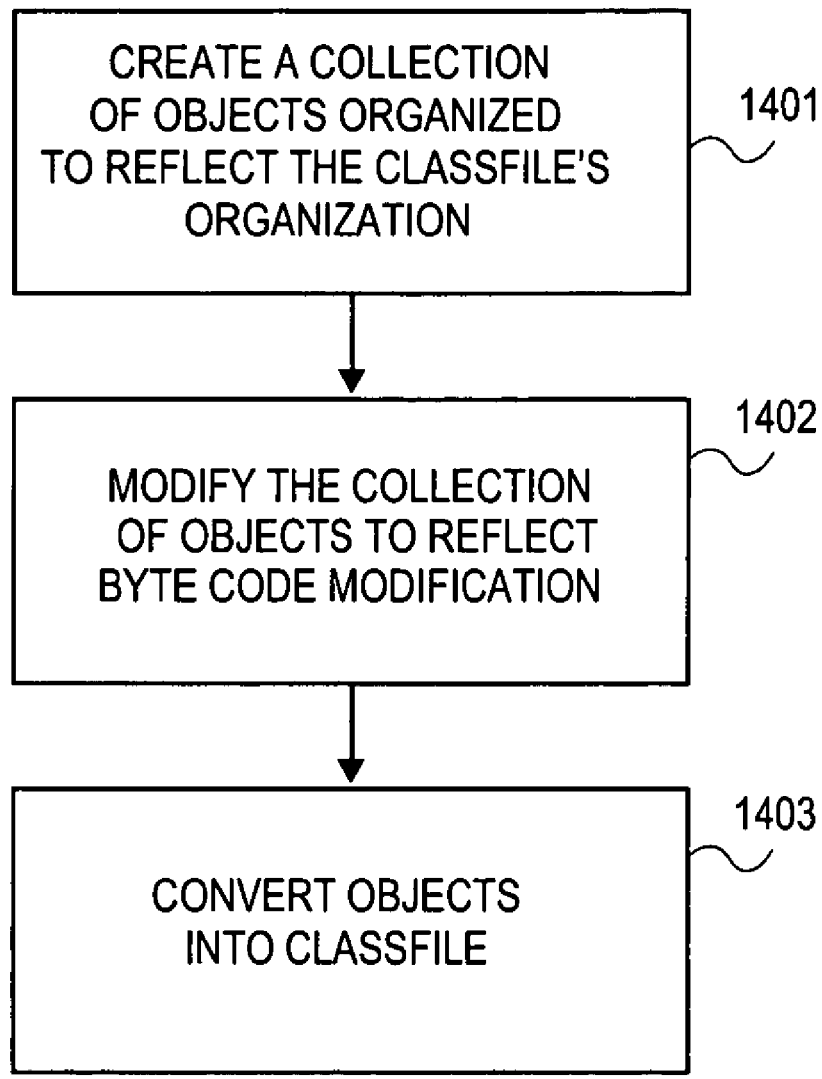
FIG. 14 shows a methodology for modifying bytecode for purposes of software debugging and/or monitoring.
Figure 15A:
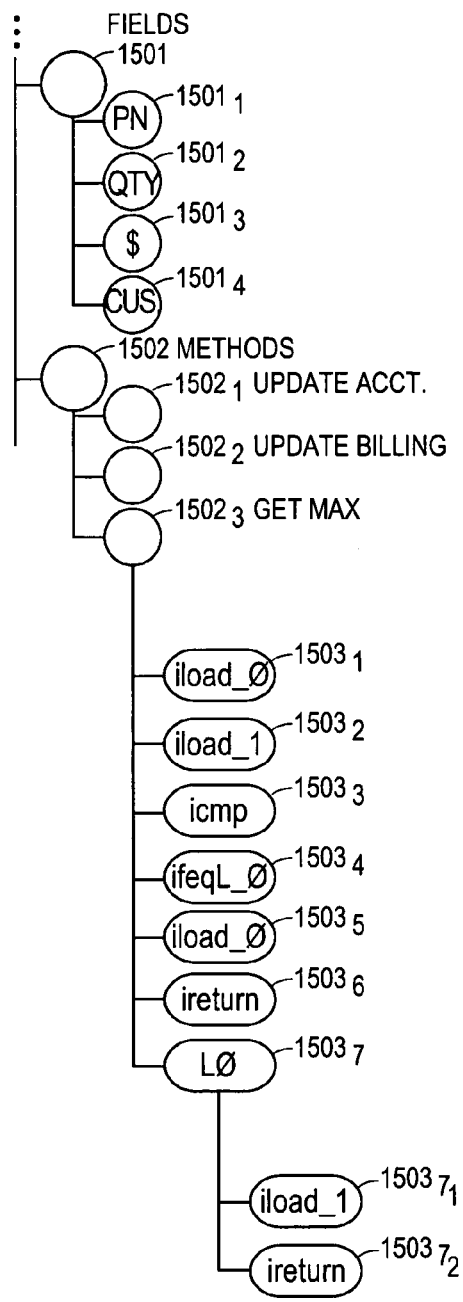
FIG. 15*a* shows a depiction of an "object tree" that is representative of a bytecode level method prior to its modification.

FIG. 14 presents a methodology that may be used to implement the bytecode modification process 452 originally presented in FIG. 4a. Recalling the notion of classfiles originally presented in reference to the exemplary "sales" classfile 103b of FIG. 1b, the methodology presented in FIG. 14 illustrates that each classfile having at least one method to be modified is converted 1401 into a collection of objects that are organized to reflect the structure of the classfile. FIG. 15a, as an example, illustrates how the "sales" classfile embodiment 103b of FIG. 1b might be converted into such a collection of objects.

Referring to the exemplary classfile 103b of FIG. 1b and the corresponding collection of objects of FIG. 15a, note that the "hierarchy" of objects observed in FIG. 15a attempts to mirror the hierarchy of the bytecode level classfile 103b illustrated in FIG. 1b. Object oriented programming has an "inheritance" property by which objects of a class inherit the properties defined for a class (e.g., the types of variables that the object can entertain specific values for). Given the existence of the inheritance property, FIG. 15a attempts to demonstrate an example of how the various features of the "sales" classfile 101b of FIG. 1b may be organized into specific classes of objects were principles of inheritance are observed.

Specifically, FIG. 15a suggests the creation of a separate class for each of the major features of the "sales" classfile 103b; and, the creation of specific instances (i.e., objects) of these classes so as to create an object oriented representation of the classfile. For example, a specific class 1501 may be created for field information structures and a specific class 1502 may be created for method information structures. The field information structure class 1501 can then be used as a template to form separate "PN", "QTY", "$" and "CUSTOMER" objects $1501_1$, $1501_2$, $1501_3$, $1501_4$ that respectively represent the "PN", "QTY", "$" and "CUSTOMER" field information structures 110 found in the "sales" classfile 103b.

Likewise, the method information structure class 1502 can be used as a template to form separate "UPDATE ACCOUNTING", "UPDATE BILLING" and "GetMax" objects $1502_1$, $1502_2$, $1502_3$ that respectively represent the "UPDATE ACCOUNTING", "UPDATE BILLING" and "GetMax" method information structures 111, 112, 131 found in the "sales" classfile 103b. FIG. 15a also elaborates on the content of the GetMax object $1502_3$. Here, the method information structure class 1502 is assumed to specify that each of its object offspring (e.g., objects $1502_1$, $1502_2$, $1502_3$) are to be associated with objects that correspond to bytecode level instructions for the method that it represents. Each of the objects 1503 observed in FIG. 15a correspond to the listed matter maintained by the GetMax object $1502_3$. Note that the listed matter observed in FIG. 15a corresponds precisely to the bytecode level instructions for the GetMax method 120b first depicted in FIG. 1c.

Figure 15B:
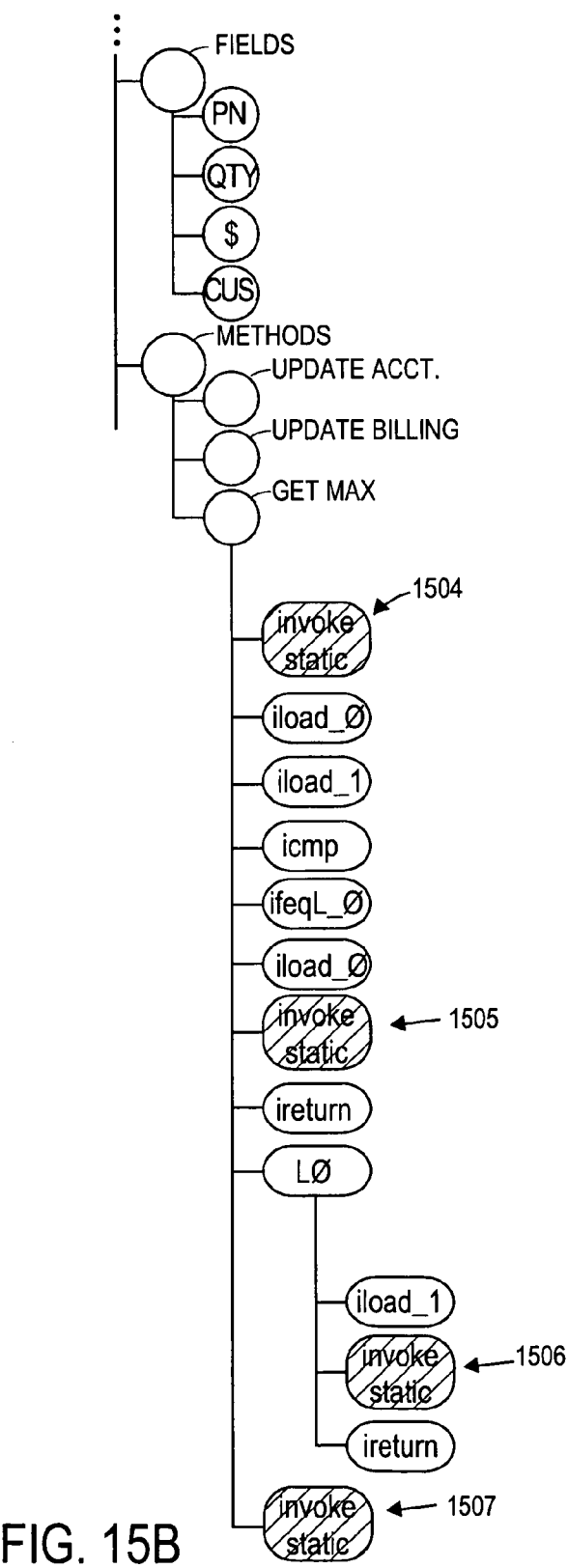
FIG. 15*b* shows a depiction of an "object tree" that is representative of a bytecode level method after its modification.

Referring back to FIG. 14, the collection of objects is then modified 1403 to reflect the bytecode modifications. FIG. 15b provides a corresponding example showing how the objects associated with the GetMax object $1502_3$ of FIG. 15a can be modified 1403 to represent the modified GetMax bytecode 620b that has been provided in FIG. 6a. Specifically, note that the listed objects has been expanded so as to include—in their proper locations—representations of the additional bytecode instructions 1504, 1505, 1506, 1507 that invoke the dispatch unit. For illustrative simplicity, FIG. 15b only shows the insertion of a single invocation instruction ("invokestatic") 1504, 1505, 1506, 1507 for each of instruction blocks 643b, 6444b, 645b and 646b of FIG. 6a.

Figure 16:
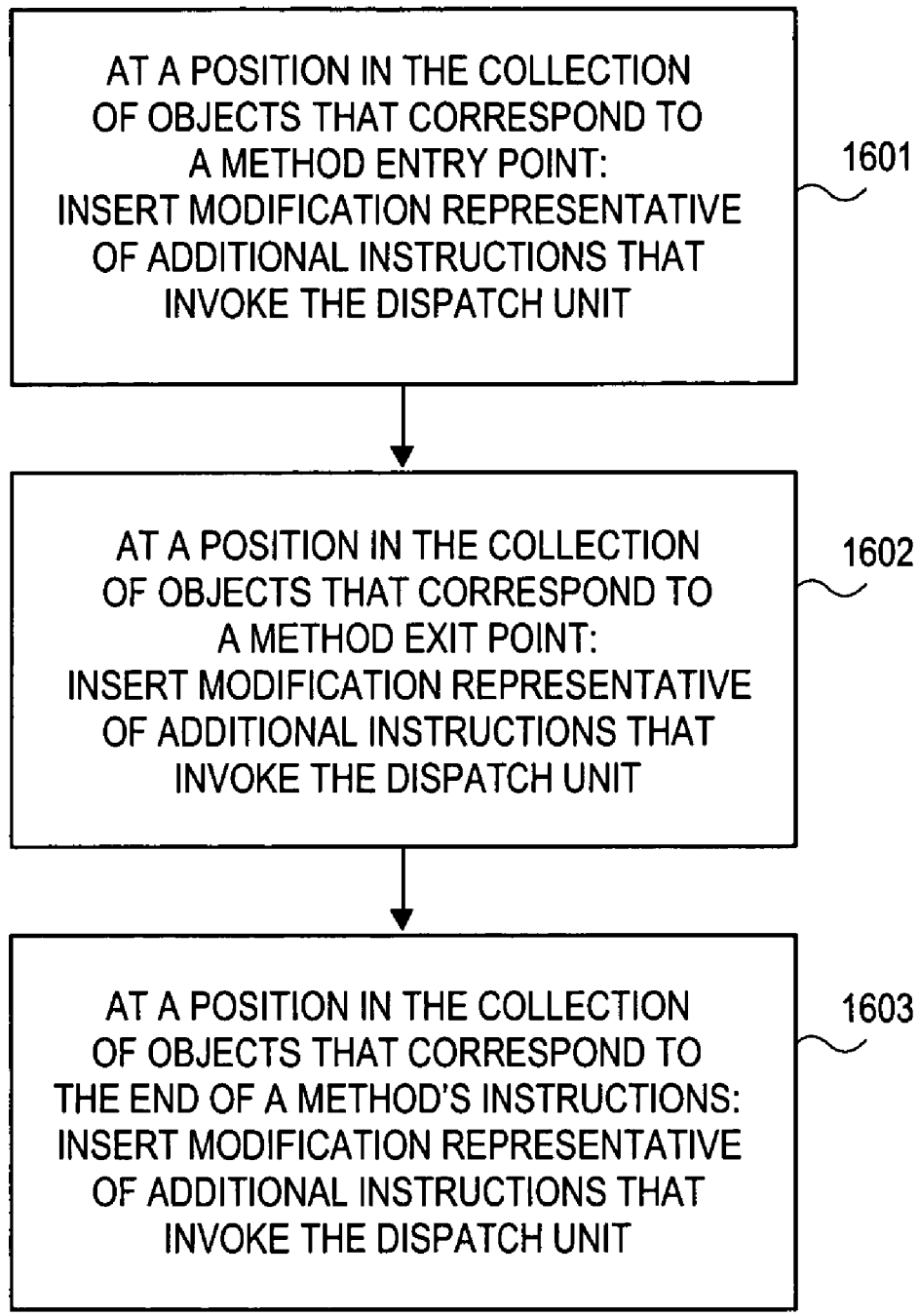
FIG. 16 shows a method for modifying an object tree that is representative of a bytecode level method so as to reflect the bytecode modification to be made to the bytecode level method.

It should be recognized however that if blocks of multiple instructions are to be inserted for each dispatch unit invocation (e.g., as suggested by instruction blocks 643b, 6444b, 645b and 646b of FIG. 6a); then, likewise, a corresponding list of instructions would be inserted at each of locations 1504, 1505, 1506, 1507. FIG. 16 shows a method that can be executed to make modifications to a collection of objects that are representative of a classfile (such as the modifications observed in FIG. 15*b*) so as to reflect the appropriate modifications to be made to a method's bytecode instructions.

According to the methodology of FIG. 16, modifications are inserted that are representative of additional instructions (e.g., a block of instructions) that invoke the dispatch unit at positions in the collection of objects that represent the following method locations: 1) a method entry point 1601 (e.g., as represented by modification 1504 of FIG. 15*b*); 2) a method exit point 1602 (e.g., as represented by modifications 1505, 1506 of FIG. 15*b*); and, 3) the end of a method's instructions for purposes of introducing try-catch block instructions 1603 (e.g., as represented by modification 1507 of FIG. 15*c*).

The example referred to in FIGS. 15*a* and 15*b* and the methodology of FIG. 16 indicate that specific methods may be represented by specific objects and their corresponding bytecode instructions may be represented by other objects that they are associated with. It is important to recognize that a collection of objects configured to represent a classfile may be modified in other aspects so as to fully represent a completely modified classfile. For example, referring back to FIG. 6*b*, recall that other bytecode level modifications may be made besides installing dispatch unit invocations at method entry and exit points and besides installing try-catch blocks around methods themselves.

Specifically, an entire method information structure may be inserted into the classfile (such as a method information structure 656 for a dispatch unit registration method); and, a new field information structure may be inserted into the classfile (such as a field information structure 657 for a classid value). In keeping with the approach outlined above with respect to FIGS. 15*a* and 15*b*, where a separate object is created for each method information structure and for each field information structure, note that the insertion of an additional method information structure would correspond to the creation of a first object in the collection of objects (e.g., a "dispatch unit registration" object); and, the insertion of an additional field information structure would correspond to the creation of a second object in the collection of objects (e.g., a "classid" object).

Thus, whereas the modifications to the class methods themselves might involve modifying the collection of objects associated with each object made to represent a method, constructing a complete collection of objects that are representative of a completely modified classfile might involve the creation of objects having no counterpart to the pre-modified bytecode (e.g., the pre-modified bytecode has no "dispatch unit registration" method information structure nor "classid" field information structure).

Referring back to FIG. 14, irrespective of how a collection of objects are made to represent a modified classfile, the collection of objects is converted into a bytecode level classfile 1403. As a consequence, a fully modified classfile is created. The conversion of a classfile into a collection of objects and the reconversion of a collection of objects into an actual classfile is a well known process, also referred to as parsing/serialization of a classfile.

5.2. Dispatch Unit Configuration

Figure 17:
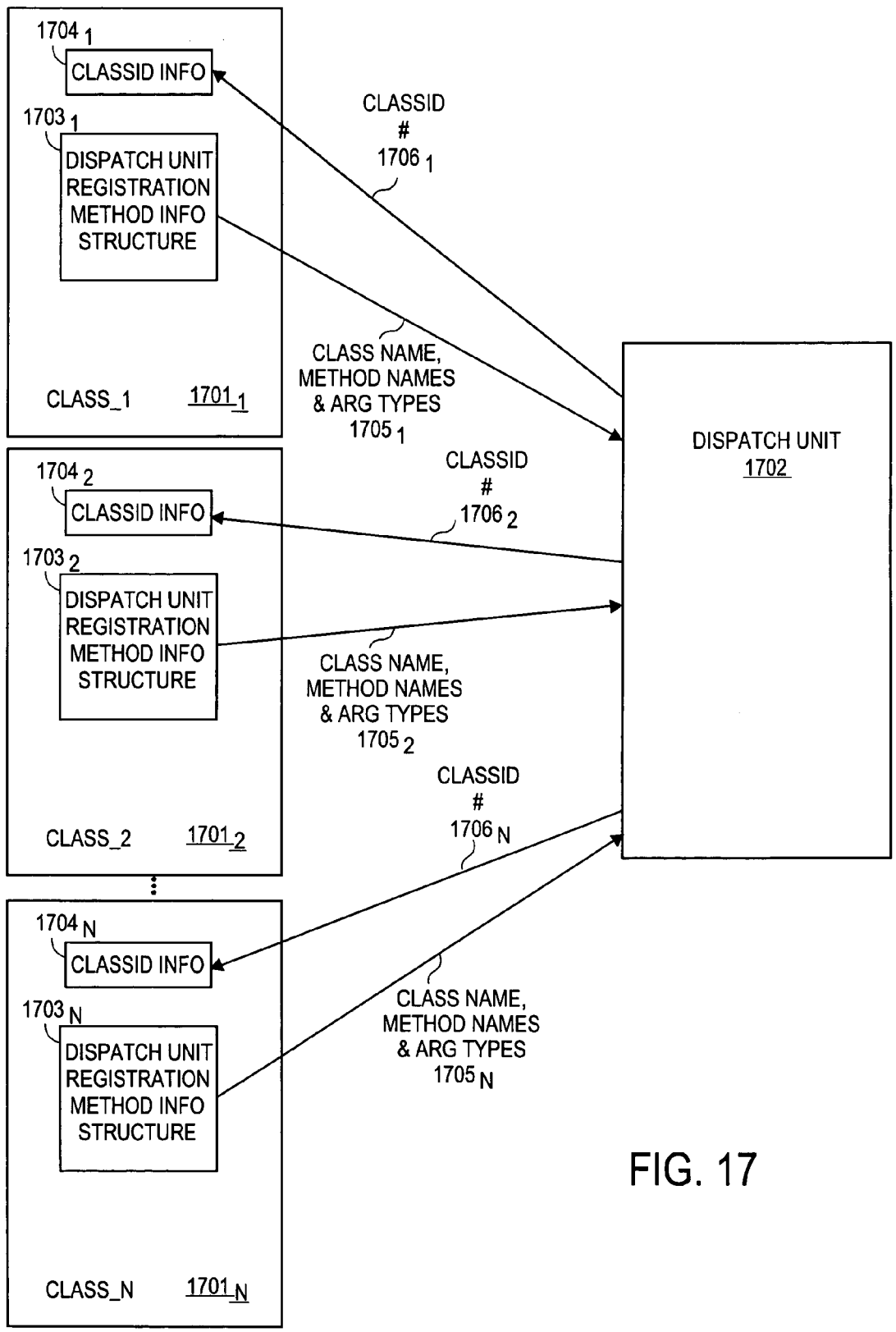
FIG. 17 shows a plurality of classsfiles registering with a dispatch unit.
Figure 18:
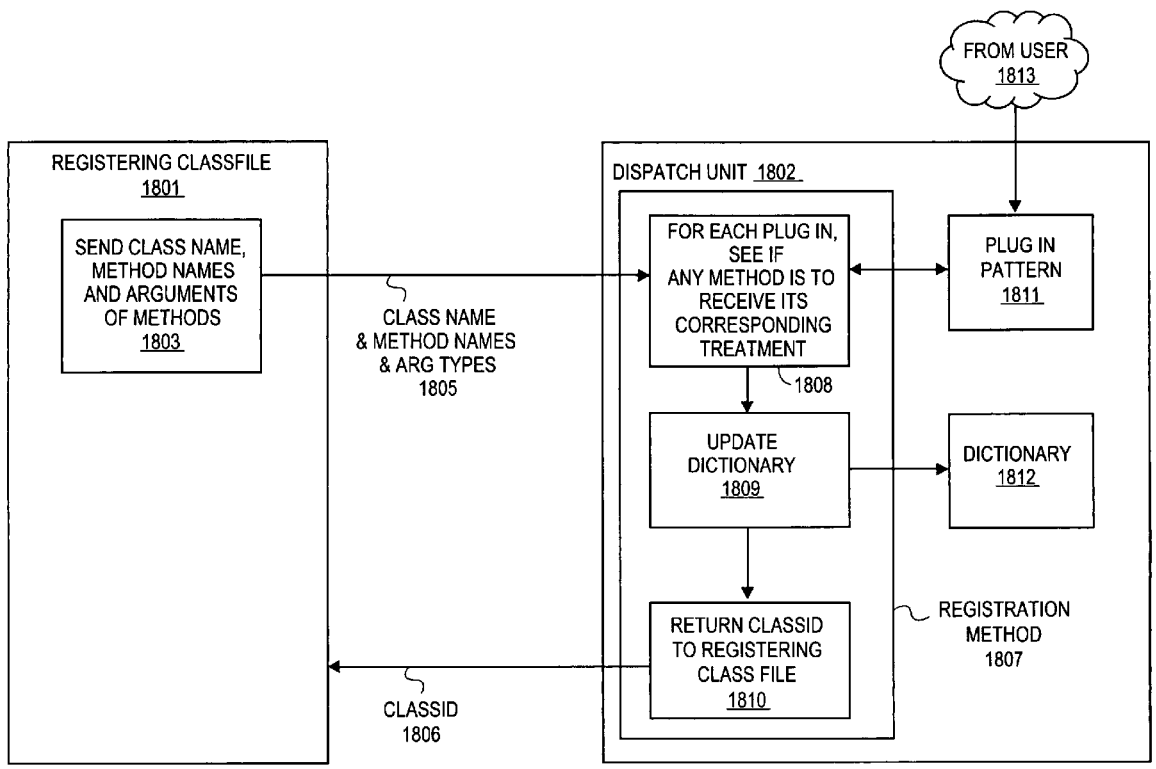
FIG. 18 shows specific methodologies that can be executed when a classfile registers with a dispatch unit.

In one embodiment of the invention, in order for the dispatch unit 330, 430 to properly dispatch an invocation from a specific method to its appropriate plug-in during runtime, the dispatch unit is configured beforehand with the appropriate information. For example, before supporting an actual runtime flow of modified bytecode, the dispatch unit 430 may run through internal processes that "set up" information (e.g., a dictionary) that correlates each bytecode modified method with one or more appropriate plug-in modules. Recall that an embodiment of such a dictionary that correlated each modified bytecode method with an appropriate plug-in module has already been discussed with respect to FIG. 7. FIGS. 17 and 18 describe some possible approaches that enable the dispatch unit 430 to configure itself to support a runtime flow invocation from a bytecode modified method.

FIG. 17 shows a plurality of modified classfiles $\mathbf{1701}_1$ through $\mathbf{1701}_N$ that each include, respectively, a "dispatch unit registration" method information structure $\mathbf{1703}_1$ through $\mathbf{1703}_N$ and a classid field information structure $\mathbf{1704}_1$ through $\mathbf{1704}_N$. Note again that a modified classfile format having such information structures has already been referred to over the course of the discussion of FIG. 6*b*. According to the depiction of FIG. 17, the method associated with each of information structures $\mathbf{1703}_1$ through $\mathbf{1703}_N$ "registers" with the dispatch unit 1702 by sending the dispatch unit 1702 its class name, the names of each of its methods and the types of arguments of its methods.

By way of example, as illustrated in FIG. 17, modified classfile $\mathbf{1701}_1$ sends the dispatch unit 1702 its class name and the names and argument types of each of its methods $\mathbf{1705}_1$; modified classfile $\mathbf{1701}_2$ sends the dispatch unit 1702 its class name and the names and argument types of each of its methods $\mathbf{1705}_2$; and modified classfile $\mathbf{1701}_N$ sends the dispatch unit 1702 its class name and the names and argument types of each of its methods $\mathbf{1705}_N$. Registration may invoke any feature of the dispatch unit's class such as a field, an object or a method.

In an embodiment, registration occurs as a consequence of a modified classfile being "loaded." The loading of a classfile can be viewed as the preparing of a class for subsequent use. In a typical case, a classfile is loaded before the classfile is used as a template for creating an object that is a member of the class that the classfile defines. In a further embodiment, a registration process is executed for a classfile before any of the classfile's modified methods are executed. So doing causes the dispatch unit 1702 to be properly updated for any subsequent invocation that arises from the execution of any of the class's modified methods.

The dispatch unit 1702 uses the class name, method names and method specific argument types received from any particular classfile as a stimulus for updating its internal information that correlates specific methods to specific plug-in modules (e.g., an internal dictionary). In various embodiments, the dispatch unit 1702 correlates class methods to their appropriate plug-in strictly numerically (i.e., without the use of character strings). For example, the dictionary of FIG. 7 may be configured to reference each classid ($c_x$), each methodid ($m_x$) as a number rather than its given character string name.

In order to reference classes and methods strictly numerically, therefore, each character string based class name (e.g., "Sales") is converted into a number (e.g., integer 1); and, each character string based method name (e.g., "GetMax", "UPDATE ACCOUNTING", "UPDATE BILLING") is converted into a corresponding number (e.g., integer 1, integer 2, integer 3). FIG. 17 suggests such an approach in that each registering classsfile $\mathbf{1701}_1$ through $\mathbf{1701}_N$ sends its class name to the dispatch unit (e.g., in the form of its given character string (e.g., "Sales" for classfile $\mathbf{1701}_1$)); and, in response, the dispatch unit 1702 returns a numeric classid $\mathbf{1706}_1$ through $\mathbf{1706}_N$ to each of the registering classfiles, respectively.

The numeric classids are configured into the dispatch unit's plug-in correlation dictionary; and, subsequent invocations made to the dispatch unit 1702 by way of a modified method are made to use the numeric classsid value rather than the given character string for the name. In further embodiments the numeric references are embodied as integers in order to improve processing speeds. Moreover, the numeric classid may be simply derived from the position at which a registering classfile registers with respect to a consecutive sequence of classfiles that register with the dispatch unit (e.g., the first classfile to register with the dispatch unit is given a classid of "1", the second classfile to register with the dispatch unit is given a classid of "2", etc.).

With respect to the conversion of character string method names into an appropriate number, in an embodiment, both the registering classsfiles $1701_1$ through $1701_N$ and the dispatch unit 1702 are made to understand that methods are referred to numerically in a sequential order. For example, according to one approach, the methods are referred to by the order in which their corresponding information structures are listed in the classfile. FIG. 1*b* helps to envision such an approach. Referring to FIG. 1*b* (and assuming that the classfile of FIG. 1*b* is modified as observed in FIG. 6*b*) note that the method information structures are listed in the following order: "GetMax", "UPDATE ACCOUNTING", "UPDATE BILLING". One way to refer to the methods in the order of their listing in the classfile is as follows: 1) "Get Max"=integer 1; 2) "UPDATE ACCOUNTING"=integer 2; 3) "UPDATE BILLING"=integer 3. According to such an approach, the same method names are used by different classes (i.e., classid 1 has methods 1, 2 and 3; and, class 2 has methods 1, 2, 3). Combining classid and methodid, however, will still produce unique "per method" identification.

By making the classfiles and the dispatch unit understand the same ordered numeric naming scheme, methods can be properly referenced between the classfiles and the dispatch unit in a manner that is consistent with the method/plug-in-handler correlation entries that are maintained by the dispatch unit. For example, if classfile 1701, corresponds to the "Sales" classfile of FIG. 1*b*, and if, the dispatch unit 1702 returns a classid value of "integer: 1" to the "Sales" classfile 1701 1, then: 1) the modified "GetMax" method will invoke the dispatch unit 1702 with a classid,methodid set of 1,1; 2) the modified "UPDATE ACCOUNTING" method will invoke the dispatch unit 1702 with a classid,methodid set of 1,2; and, 3) the modified "UPDATE BILLING" method will invoke the dispatch unit 1702 with a classid,methodid set of 1,3. Likewise, the dispatch unit would correlate identical numerical entries listed above to the proper plug-in handler treatment for each of the three methods.

In an embodiment, during the registration process, a registering classfile sends method names in character string form to the dispatch unit 1702 in an order that allows the dispatch unit 1702 to properly deduce the correct numeric methodid values. For example, continuing with the above example, the "Sales" classfile $1701_1$ would send method character string names in the following order: "GetMax", "UPDATE ACCOUNTING", "UPDATE BILLING". By sending the character string names in the order listed above, both the registering classfile and the dispatch unit could independently recognize that the "GetMax" method is be given a methodid value of 1; the "UPDATE ACCOUNTING" method is to be given a value of 2; and, the "UPDATE BILLING" method is to be given a value of 3.

Even though the dispatch unit 1702 can deduce the proper numeric naming scheme simply from knowing the order of the methods, explicit character strings are sent to the dispatch unit 1702 to also assist the dispatch unit in the updating of its method/plug-in module correlation scheme. FIG. 18 helps explore this aspect in more detail. FIG. 18 shows a registering classfile 1801 and a dispatch unit 1802. Consistent with the preceding discussion concerning FIG. 17, note that the registering classfile 1801 can be regardred as sending 1803 the class names and method names 1805 in character string format (e.g., "Sales", "GetMax", "UPDATE ACCOUNTING", "UPDATE BILLING"). In response, the dispatch unit's registration method 1807 refers to a plug-in pattern 1811 to identify which plug-in modules are to be applied to which methods 1808. The plug-in pattern, in an embodiment, includes a list, for each plug-in module, of every method (e.g., by class name and method name in character string format) it is expected to treat.

For example, referring back to FIG. 4*b*, recall that plug-in module A 460 was configured to treat methods 405, 406 and 408 while plug-in module B was configured to treat only the third method 407. In such an instance, the substantive content of the lists maintained by the plug-in pattern 1811 would be as follows:

1) PlugIn A (460):
  1.1) [character string name of class for method_1 (405)], [character string name of method_1 (405)];
  1.2) [character string name of class for method_2 (406)], [character string name of method_2 (406)];
  1.3) [character string name of class for method_4 (408)], [character string name of method_4 (408)];
2) PlugIn B (470):
  2.1) [character string name of class for method_3 (407)], [character string name of method_3 (407)];

In an embodiment, the plug-in pattern 1811 is a body of information maintained (e.g., by way of an object) by the same class that the dispatch unit 1802 is associated with.

Once one or more appropriate plug-in modules have been identified by the dispatch unit's registration methodology 1807, the scheme used to correlate specific methods to their appropriate plug-in module(s) during runtime (e.g., dictionary 1812) is updated 1809 to account for all the methods of the registering classfile. The argument types for each method that are provided by a registering classfile can be added to the classid and methodid in each listing. If strictly numeric references are to be used for the classids and methodids, the character string-to-numeric conversion should be performed prior to the actual update 1809. For example, numeric methodids should be assigned based on the order of reception of method names from the registering classfile 1803; and, a suitable numeric classid should be identified. In an embodiment, the numeric classid is determined simply by incrementing a counter for each new registering classfile. The numeric classsid is then sent 1810 to the registering classfile 1801.

Given that the embodiment of the plug-in pattern described above identifies methods through their corresponding character strings, the dispatch unit's registration method 1807 would need a registering classfile 1801 to identify its methods with these same character strings so that the correct correlation between a modified method and its proper plug-in treatment could be carried out. Here, the use of character strings is emphasized because some form of "user" 1813 (e.g., a test or development engineer or maintenance Information Science (IS) personal) ultimately determines which methods are to receive which treatment from which plug-in modules.

For example, in the case of Distributed Statistical Records (DSR), typically, only a subset of eligible methods are selected for modification (e.g., "the important ones"). The intelligent selection of specific methods for modification ultimately boils down to their being listed by the plug-in pattern 1811. Accordingly, since methods and classes are most often dealt with by a user at a source code level or higher (e.g., GUI) with character strings—it is natural to expect that a "list" of methods to be treated as determined by a user would be listed in a character string format. Of course, in alternate embodiments, an initial list of character string names could be pre-formulated prior to registration so as to be represented purely in numeric form. This, in turn, may obviate registering with character strings.

5.3 Interfaces

Figure 19A:
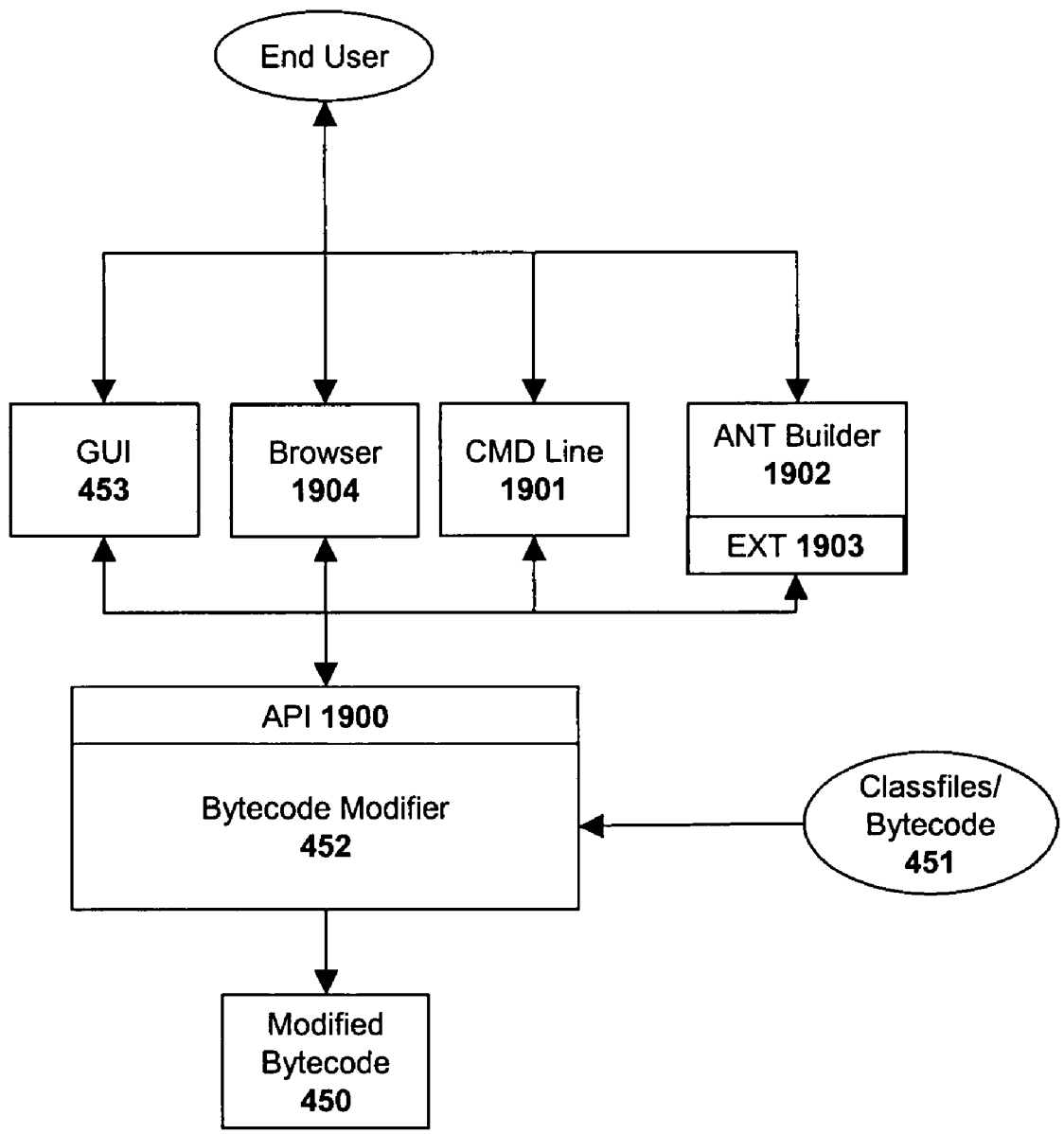
FIGS. 19*a–g* illustrate different user interfaces and techniques for modifying bytecode.

Bytecode modification may be accomplished using a variety of different techniques and interfaces. As indicated in FIG. 19a, in one embodiment, an application programming interface ("API") of the bytecode modifier 1900 is exposed, thereby providing direct access to end users. As indicated in FIGS. 19a and e, the API may be published, thereby providing access the various classfiles of the API via a standard Web browser 1940. Similarly, as illustrated in FIGS. 19a and f, the API may be accessed and bytecode may be modified via a standard command line interface 1901. The command line interface 1901 is particularly suitable for batch files or environments in which running a graphical user interface (e.g., such as that described below) would be undesirable due to weak hardware, for example, or an operating system which is primarily console-oriented.

As illustrated in FIGS. 19a and g, in one embodiment, extensions 1903 are provided to the Apache Ant builder application 1902. Apache Ant is a well known open-source build tool for compiling, packaging, copying, etc.—in one word "building"—Java applications (see, e.g., the website located at akarta.apache.org/ant). The extensions 1903 to the Ant builder application 1902 allow the end user to generate modified bytecode as part of the build process. For example, an ant task may be particularly suitable for automatic build scripts in which it is used to modify one or more classes after compilation (e.g., within a J2EE engine).

Figure 19B:
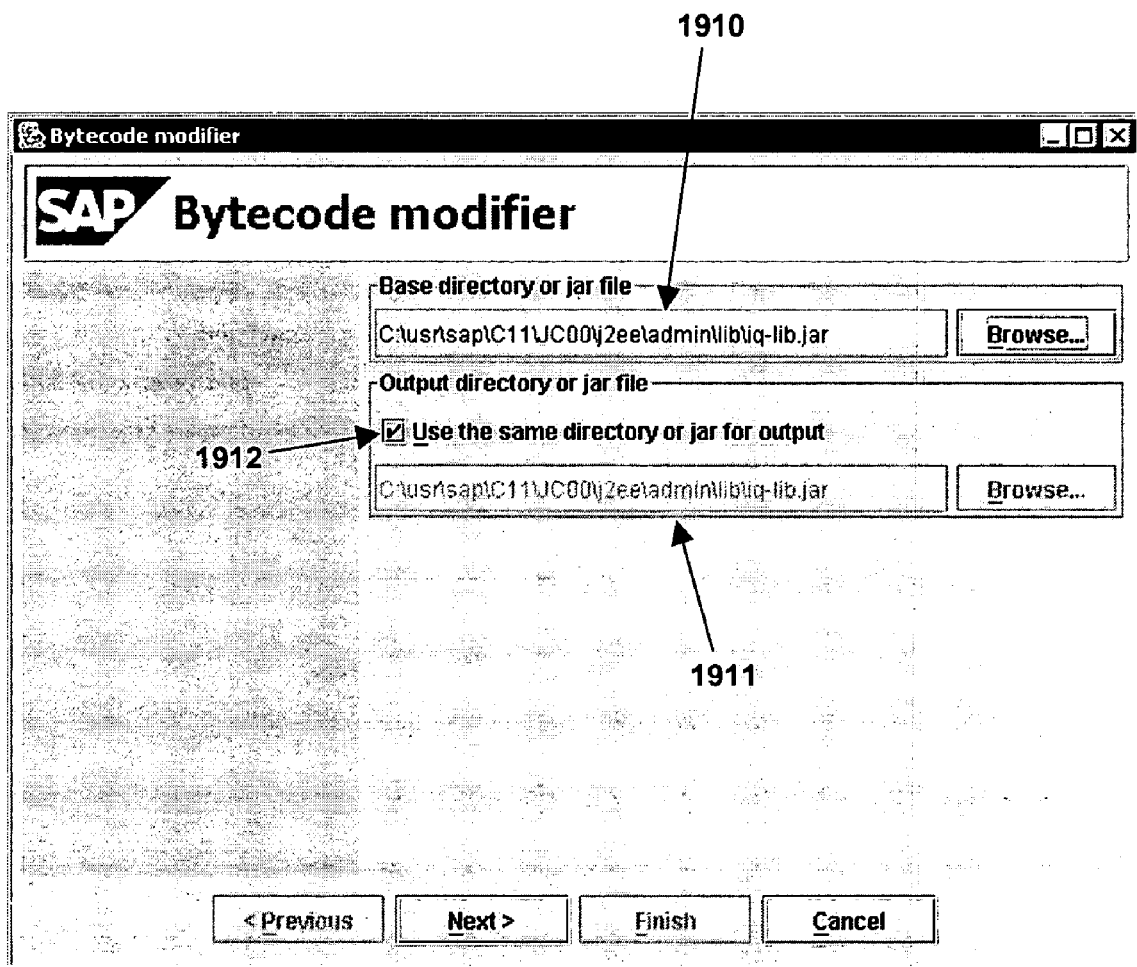

In addition, in one embodiment, a wizard-based GUI is provided for simplifying the bytecode modification process. Referring to FIG. 19b, the user is initially provided with a source data field 1910 to identify a particular directory or file containing packages, classes or methods to be modified; and a output data field 1911, to identify a destination directory or file for the results of the bytecode modification process. In one embodiment, a check box 1912 is provided to allow the user to set the output directory or file to be the same as the source directory or file. In the particular example illustrated in FIG. 19b, the user selects the "util" package, identified by the *.jar file "iq-lib.jar."

Figure 19C:
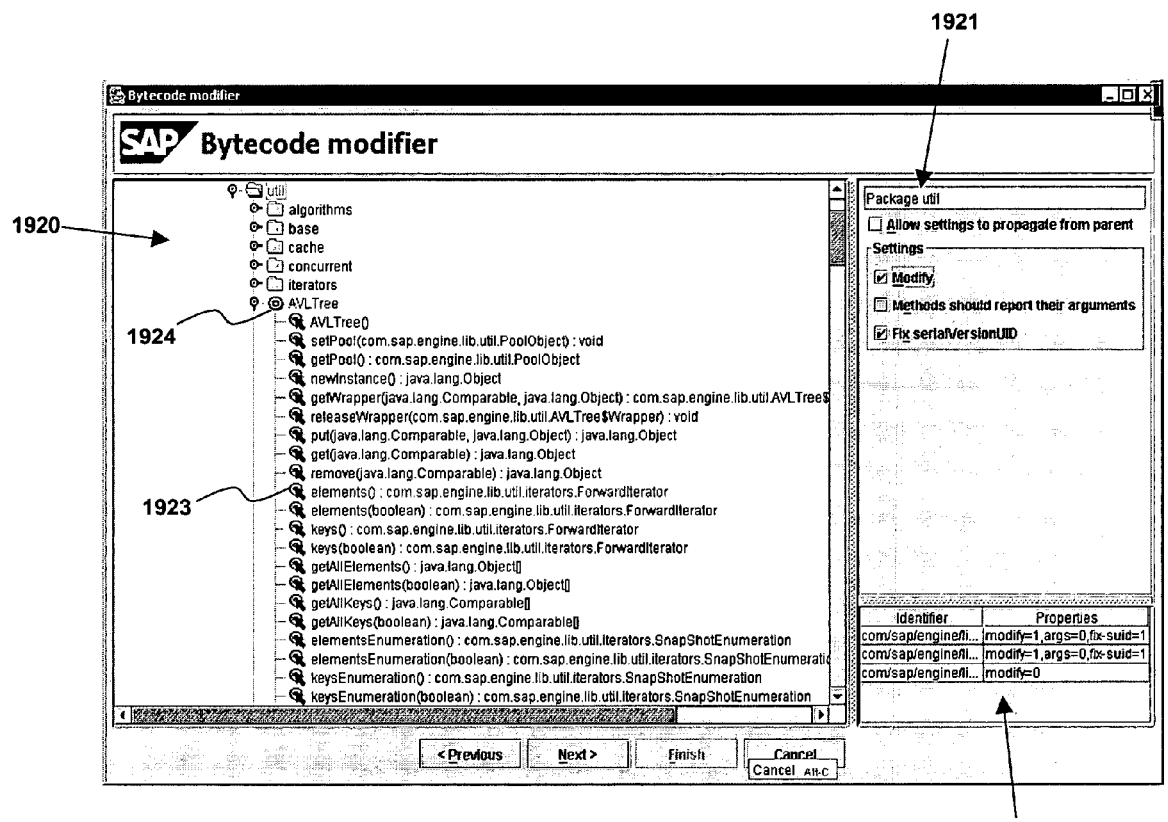
Figure 19D:
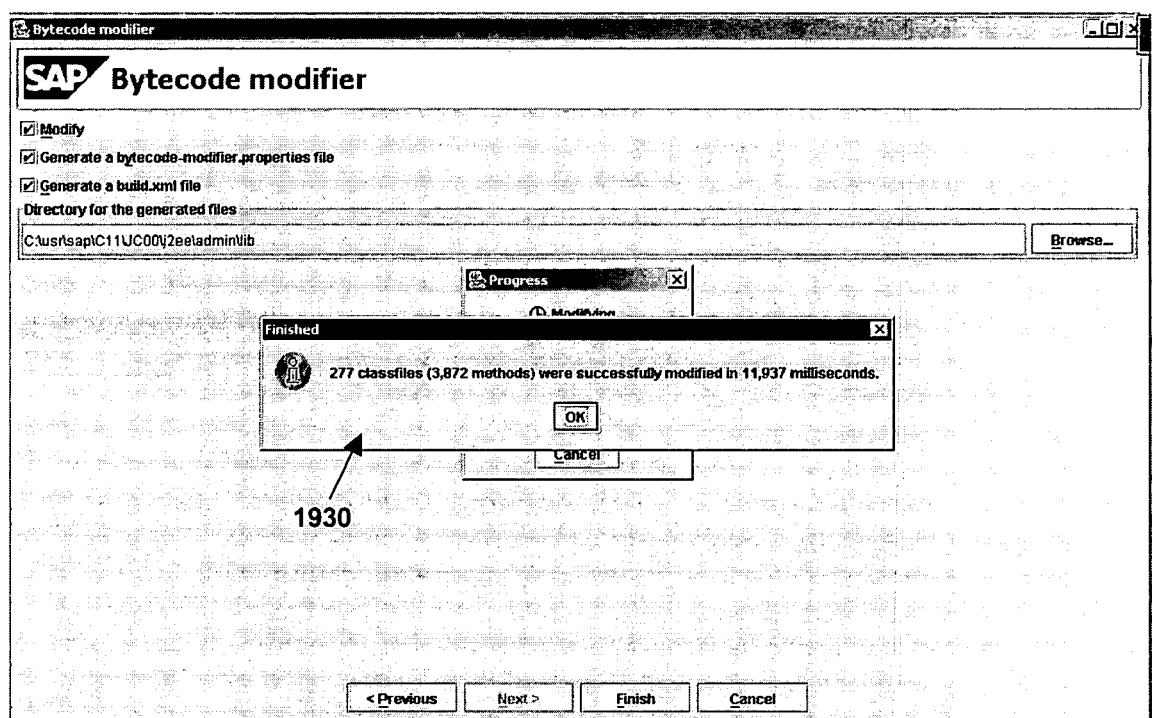
Figure 19E:
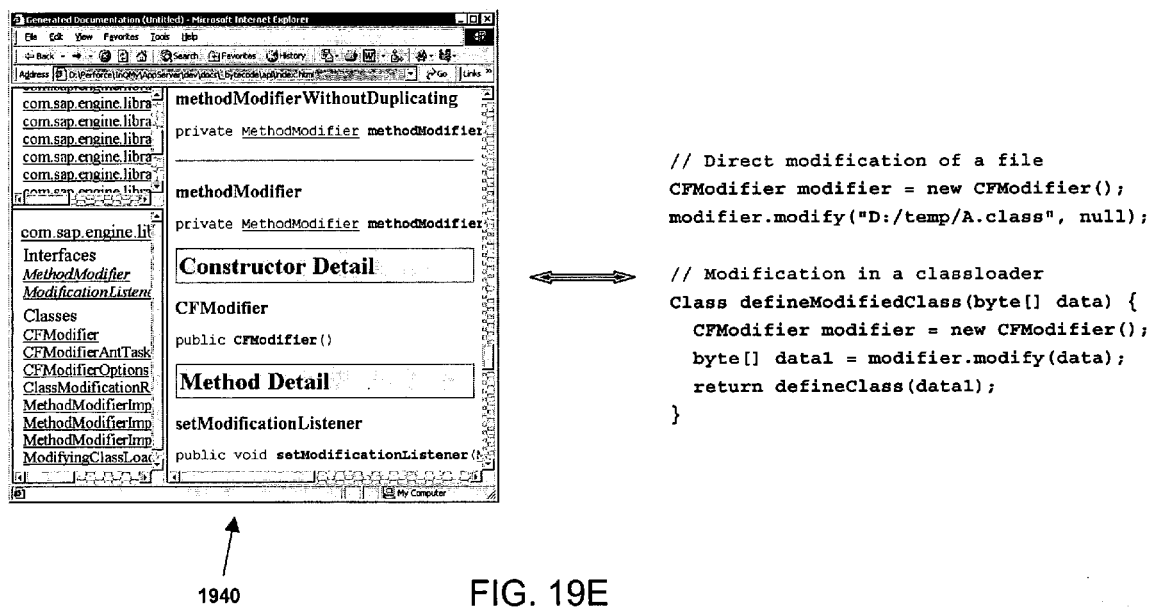
Figure 19F:
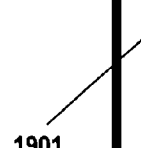
Figure 19G:
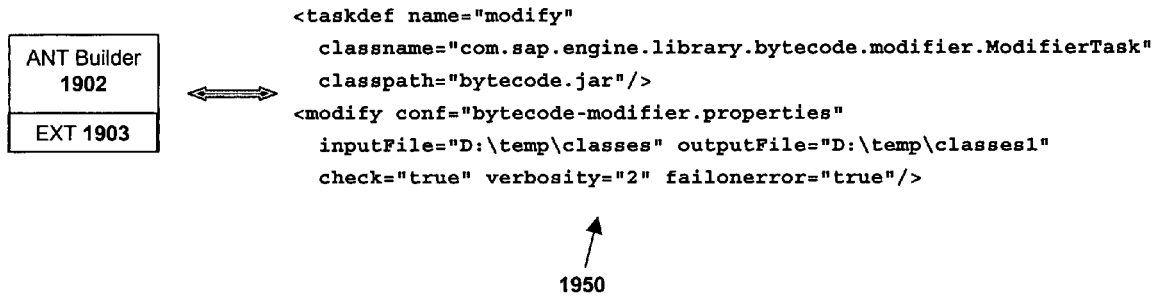

FIG. 19c illustrates a second window 1920 which provides a hierarchical representation of information related to the "util" package. The "util" package is identified as such within data field 1921. A specific element 1923 (e.g., classfile) within the tree 1924 is highlighted. As a result, methods associated with the highlighted element are displayed within a table 1922. The table includes an "identifier" column for identifying each method, and a "properties" column, containing (among other properties) an indication as to whether the method will be modified by the bytecode modification process. For example, if the parameter "modify" is set to a binary '1', then the bytecode modifier will modify the method. By contrast, if "modify" is set to a binary '0', then the bytecode modifier will not modify the method. Thus, the user may specify whether the method is to be modified by setting the value of the "modify" parameter. Following the bytecode modification process, FIG. 19d illustrates a completion window 1930 which indicates the number of classfiles and method which were modified and the length of time consumed by the modification process.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, hard-disk drives, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details.

Accordingly, the scope and spirit of the invention should be judged in terms of the claims which follow.

What is claimed is:

1. A classfile modification method, comprising:
   before loading and using a classfile to create an object during runtime;
   converting said classfile into a collection of objects, said collection of objects including a first object that represents a method information structure found in said classfile, said collection of objections including a second object that inherits a property that said first object has, said second object representing a bytecode instruction of a method;
   adding a third object to said collection of objects, said third object inheriting the properties of said first object, said third object representing a bytecode instruction to be executed by said method that, when executed by said method, invokes a pre-existing dispatcher to identify a plug-in module for said method that said method invokes to report and/or record information about said method;
   adding a fourth object to said collection of objects that represents a new method information structure for said classfile, said new method information structure containing byte code instructions for a second method that registers, with said dispatcher upon loading of said classfile, an identity of said classfile's class and respective identities of methods of said classfile, said dispatcher and plug-in module being in existence prior to said loading of said classfile; and,
   converting said collection of objects including said third object into a modified version of said classfile.

2. The classfile modification method of claim 1, further comprising adding a fifth object to said collection of objects that represents a new field information structure for said classfile.

3. The classfile modification method of claim 2, wherein said field information structure is to store a numeric identification assigned to said class by said dispatcher.

4. The classfile modification method of claim 1, wherein said third object is added to said collection of objects in a position that corresponds to a region of said method's instructions that is executed just after said method's entry point is reached.

5. The classfile modification method of claim 4, wherein said classfile is a Java compatible classfile and said adding of said third object corresponds to the addition of an invokestatic instruction.

6. The classfile modification method of claim 4, wherein said classfile is a Java compatible classfile and said adding of said third object corresponds to the addition of an invokevirtual instruction.

7. The classfile modification method of claim 1, wherein said third object is added to said collection of objects at a position that corresponds to a region of said method's instructions that is executed if an exit point of said method will inevitably be reached.

8. The classfile modification method of claim 7 wherein said classfile is a Java compatible classfile and said adding of said third object corresponds to the addition of an invokestatic instruction.

9. The classfile modification method of claim 7 wherein said classfile is a Java compatible classfile and said adding of said third object corresponds to the addition of an invokevirtual instruction.

10. The classfile modification method of claim 1, wherein said third object is added to said collection of objects in a position that corresponds to a region of said method's instructions that will be executed if an error arises during execution of said method.

11. The classfile modification method of claim 10, wherein said classfile is a Java compatible classfile and said adding of said third object corresponds to the addition of an invokestatic instruction.

12. The classfile modification method of claim 10, wherein said classfile is a Java compatible classfile and said adding of said third object corresponds to the addition of an invokevirtual instruction.

13. The classfile modification method of claim 1, further comprising:
  adding said third object to said collection of objects at a position that corresponds to a region of said method's instructions that is executed just after said method's entry point is reached;
  adding a fifth object to said collection of objects at a position that corresponds to a region of said method's instructions that is executed if an exit point of said method will inevitably be reached; and,
  adding a sixth object to said collection of objects at a position that corresponds to a region of said method's instructions that will be executed if an error arises during execution of said method.

14. The classfile modification method of claim 13, wherein said classfile is a Java compatible classfile and said third, fifth and sixth objects correspond to the addition of invokestatic instructions.

15. The classfile modification method of claim 13, wherein said classfile is a Java compatible classfile and said third, fifth and sixth objects correspond to the addition of invokevirtual instructions.

16. A machine readable storage medium containing instructions which when executed cause a classfile modification method to be performed, said classfile modification method comprising:
  before loading and using a classfile to create an object during runtime;
  converting said classfile into a collection of objects, said collection of objects including a first object that represents a method information structure found in said classfile, said collection of objections including a second object that inherits a property that said first object has, said second object representing a bytecode instruction of a method;
  adding a third object to said collection of objects, said third object inheriting the properties of said first object, said third object representing a bytecode instruction to be executed by said method that, when executed by said method, invokes a pre-existing dispatcher to identify a plug-in module for said method that said method invokes to report and/or record information about said method;
  adding a fourth object to said collection of objects that represents a new method information structure for said classfile, said new method information structure containing byte code instructions for a second method that registers, with said dispatcher upon loading of said classfile, an identity of said classfile's class and respective identities of methods of said classfile, said dispatcher and plug-in module being in existence prior to said loading of said classfile; and,
  converting said collection of objects including said third object into a modified version of said classfile.

17. The machine readable storage medium of claim 16, wherein said classfile modification method further comprises adding a fifth object to said collection of objects that represents a new field information structure for said classfile.

18. The machine readable storage medium of claim 17, wherein said field information structure is to store a numeric identification assigned to said class by said dispatcher.

19. The machine readable storage medium of claim 16, wherein said third object is added to said collection of objects in a position that corresponds to a region of said method's instructions that is executed just after said method's entry point is reached.

20. The machine readable storage medium of claim 19, wherein said classfile is a Java compatible classfile and said adding of said third object corresponds to the addition of an invokestatic instruction.

21. The machine readable storage medium of claim 19, wherein said classfile is a Java compatible classfile and said adding of said third object corresponds to the addition of an invokevirtual instruction.

22. The machine readable storage medium of claim 16, wherein said third object is added to said collection of objects at a position that corresponds to a region of said method's instructions that is executed if an exit point of said method will inevitably be reached.

23. The machine readable storage medium of claim 22, wherein said classfile is a Java compatible classfile and said adding of said third object corresponds to the addition of an invokestatic instruction.

24. The machine readable storage medium of claim 22, wherein said classfile is a Java compatible classfile and said adding of said third object corresponds to the addition of an invokevirtual instruction.

25. The machine readable storage medium of claim 16, wherein said third object is added to said collection of objects in a position that corresponds to a region of said method's instructions that will be executed if an error arises during execution of said method.

26. The machine readable storage medium of claim 25, wherein said classfile is a Java compatible classfile and said adding of said third object corresponds to the addition of an invokestatic instruction.

27. The machine readable storage medium of claim 25, wherein said classfile is a Java compatible classfile and said adding of said third object corresponds to the addition of an invokevirtual instruction.

28. The machine readable storage medium of claim 16, wherein said classfile modification method further comprises:
adding said third object to said collection of objects at a position that corresponds to a region of said method's instructions that is executed just after said method's entry point is reached;
adding a fifth object to said collection of objects at a position that corresponds to a region of said method's instructions that is executed if an exit point of said method will inevitably be reached; and,
adding a sixth object to said collection of objects at a position that corresponds to a region of said method's instructions that will be executed if an error arises during execution of said method.

29. The machine readable storage medium of claim 28, wherein said classfile is a Java compatible classfile and said third, fifth and sixth objects correspond to the addition of invokestatic instructions.

30. The machine readable storage medium of claim 28, wherein said classfile is a Java compatible classfile and said third, fifth and sixth objects correspond to the addition of invokevirtual instructions.

31. A computing system implemented with a machine readable storage medium and/or memory containing instructions which when executed cause a classfile modification method to be performed, said classfile modification method comprising:
before loading and using a classfile to create an object during runtime;
converting said classfile into a collection of objects, said collection of objects including a first object that represents a method information structure found in said classfile, said collection of objections including a second object that inherits a property that said first object has, said second object representing a bytecode instruction of a method;
adding a third object to said collection of objects, said third object inheriting the properties of said first object, said third object representing a bytecode instruction to be executed by said method that, when executed by said method, invokes a pre-existing dispatcher to identify a plug-in module for said method that said method invokes to report and/or record information about said method;
adding a fourth object to said collection of objects that represents a new method information structure for said classfile, said new method information structure containing byte code instructions for a second method that registers, with said dispatcher upon loading of said classfile, an identity of said classfile's class and respective identities of methods of said classfile, said dispatcher and plug-in module being in existence prior to said loading of said classfile; and,
converting said collection of objects including said third object into a modified version of said classfile.

32. The computing system of claim 31, wherein said classfile modification method further comprises adding a fifth object to said collection of objects that represents a new field information structure for said classfile.

33. The computing system of claim 32, wherein said field information structure is to store a numeric identification assigned to said class by said dispatcher.

34. The computing system of claim 31, wherein said third object is added to said collection of objects in a position that corresponds to a region of said method's instructions that is executed just after said method's entry point is reached.

35. The computing system of claim 34, wherein said classfile is a Java compatible classfile and said adding of said third object corresponds to the addition of an invokestatic instruction.

36. The computing system of claim 34, wherein said classfile is a Java compatible classfile and said adding of said third object corresponds to the addition of an invokevirtual instruction.

37. The computing system of claim 31 wherein said adding at least one additional other object further comprises adding an additional other object at a position that corresponds to a region of said unique method's instructions that is executed if an exit point of said unique method will inevitably be reached.

38. The computing system of claim 37, wherein said third object is added to said collection of objects at a position that corresponds to a region of said method's instructions that is executed if an exit point of said method will inevitably be reached.

39. The computing system of claim 37, wherein said classfile is a Java compatible classfile and said adding of said third object corresponds to the addition of an invokestatic instruction.

40. The computing system of claim 31, wherein said third object is added to said collection of objects in a position that corresponds to a region of said method's instructions that will be executed if an error arises during execution of said method.

41. The computing system of claim 40, wherein said classfile is a Java compatible classfile and said adding of said third object corresponds to the addition of an invokestatic instruction.

42. The computing system of claim 40, wherein said classfile is a Java compatible classfile and said adding of said third object corresponds to the addition of an invokevirtual instruction.

43. The computing system of claim 31, wherein said classfile modification method further comprises:
adding said third object to said collection of objects at a position that corresponds to a region of said method's instructions that is executed just after said method's entry point is reached;
adding a fifth object to said collection of objects at a position that corresponds to a region of said method's instructions that is executed if an exit point of said method will inevitably be reached; and,
adding a sixth object to said collection of objects at a position that corresponds to a region of said method's instructions that will be executed if an error arises during execution of said method.

44. The computing system of claim 43, wherein said classfile is a Java compatible classfile and said third, fifth and sixth objects correspond to the addition of invokestatic instructions.

45. The computing system of claim 43, wherein said classfile is a Java compatible classfile and said third, fifth and sixth objects correspond to the addition of invokevirtual instructions.

* * * * *